United States Patent
Andreis

(10) Patent No.: US 7,592,814 B2
(45) Date of Patent: *Sep. 22, 2009

(54) METHOD FOR MONITORING AN AREA CONTAINING A SUBTERRANEAN RESISTIVE OR CONDUCTIVE BODY, AND FOR OBTAINING A VOLUME OF HYDROCARBON THEREFROM

(75) Inventor: David Andreis, Aberdeen (GB)

(73) Assignee: OHM Limited, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/045,490

(22) Filed: Mar. 10, 2008

(65) Prior Publication Data

US 2008/0150538 A1    Jun. 26, 2008

Related U.S. Application Data

(63) Continuation of application No. 11/353,408, filed on Feb. 14, 2006, now Pat. No. 7,362,102.

(30) Foreign Application Priority Data

Feb. 22, 2005    (GB)    ................... 0503627.2

(51) Int. Cl.
   *G01V 3/02*    (2006.01)
(52) U.S. Cl. ....................... 324/365; 324/357
(58) Field of Classification Search ................. 324/334, 324/345–365
   See application file for complete search history.

(56) References Cited

U.S. PATENT DOCUMENTS 5,770,945 A    6/1998    Constable
7,362,102 B2 *  4/2008    Andreis ...................... 324/365

FOREIGN PATENT DOCUMENTS

GB    2 382 875    6/2003
GB    2 385 923    9/2003

(Continued)

OTHER PUBLICATIONS

MacGregor, L. M. et al. "Use of marine controlled source electromagnetic sounding for sub-basalt exploration." *Geophysical Prospecting*. 48 (2000): 1091-1106.

(Continued)

*Primary Examiner*—Jay M Patidar
(74) *Attorney, Agent, or Firm*—Renner, Otto, Boisselle & Sklar, LLP

(57) ABSTRACT

A method of analyzing electromagnetic survey data from an area of seafloor 6 that is thought or known to contain a resistive or conductive body, for example a subterranean hydrocarbon reservoir 12, is described. The method includes providing horizontal electromagnetic field data obtained by at least one receiver 125 from at least one horizontal electric dipole transmitter 22. Horizontal gradients in the electromagnetic field data are determined for a first component of the electromagnetic field data along a first direction and for a second component of the electromagnetic field data along a second direction. The first and second components can be the electric field along the first and second directions, or the magnetic field perpendicular to the first direction and second directions. The gradients are then combined to provide combined response data. Because the combined response data are relatively insensitive to the transverse electric (TE) mode component of the transmitted signal, the method allows hydrocarbon reservoirs to be detected in shallow water where the TE mode component interacting with the air would otherwise dominate.

14 Claims, 28 Drawing Sheets

FOREIGN PATENT DOCUMENTS

| | | |
|---|---|---|
| GB | 2 390 904 | 1/2004 |
| GB | 2 402 745 | 12/2004 |
| WO | 02/14906 | 2/2002 |
| WO | 03/104844 | 12/2003 |
| WO | 2004/053528 | 6/2004 |
| WO | 2005/010560 | 2/2005 |

OTHER PUBLICATIONS

MacGregor, L.M. et al. "The Ramesses experiment III: Controlled source electromagnetic sounding of the Reykjanes Ridge at 57° 45' N." *Geophysical Journal International.* 135 (1998): 773-789.

Eidesmo, T. et al. "Sea Bed Logging (SBL), a new method for remote and direct identification of hydrocarbon filled layers in deepwater areas." *First Break.* 20.3 (2002): 144-152.

Ellingsrud, S. et al. "Remote sensing of hydrocarbon reservoirs by seabed logging (SBL): Results from a cruise offshore Angola." *The Leading Edge.* 21 (2002): 972-982.

Chave, A. D. et al. "Controlled electromagnetic sources for measuring electrical conductivity beneath the oceans, 1. Forward problem and model study." *Journal of Geophysical Research.* 87.B7 (1982): 5327-5338.

Constable, S.C. et al. "Marine magnetotellurics for petroleum exploration Part 1: A seafloor equipment system." *Geophysics.* 63.3 (1998): 816-825.

\* cited by examiner $$E_r = \frac{P\rho_0 \cos\phi}{4\pi} \int_0^\infty \Bigg[ \bigg( -\beta_0 \underbrace{\frac{kJ_0(kr) - \frac{J_1(kr)}{r}}{1 + R_L^{TM} e^{-2\beta_0 h}}}_{TM} + i \underbrace{\frac{\omega\mu_0 J_1(kr)}{r\beta_0 \rho_0 (1 - R_A^{TE} R_L^{TE} e^{-2\beta_0 h})}}_{TE} \bigg) e^{-\beta_0 |z-z'|} +$$

$$\bigg( \beta_0 \underbrace{\frac{kJ_0(kr) - \frac{J_1(kr)}{r}}{1 + R_L^{TM} e^{-2\beta_0 h}} R_L^{TM}}_{TM} + i \underbrace{\frac{\omega\mu_0 J_1(kr)}{r\beta_0 \rho_0 (1 - R_A^{TE} R_L^{TE} e^{-2\beta_0 h})} R_L^{TE}}_{TE} \bigg) e^{-\beta_0 (z+z')} +$$

$$\bigg( -\beta_0 \underbrace{\frac{kJ_0(kr) - \frac{J_1(kr)}{r}}{1 + R_L^{TM} e^{-2\beta_0 h}}}_{TM} + i \underbrace{\frac{\omega\mu_0 J_1(kr)}{r\beta_0 \rho_0 (1 - R_A^{TE} R_L^{TE} e^{-2\beta_0 h})} R_A^{TE}}_{TE} \bigg) e^{\beta_0 (z+z'-2h)} +$$

$$\bigg( \beta_0 \underbrace{\frac{kJ_0(kr) - \frac{J_1(kr)}{r}}{1 + R_L^{TM} e^{-2\beta_0 h}} R_L^{TM}}_{TM} + i \underbrace{\frac{\omega\mu_0 J_1(kr)}{r\beta_0 \rho_0 (1 - R_A^{TE} R_L^{TE} e^{-2\beta_0 h})} R_A^{TE} R_L^{TE}}_{TE} \bigg) e^{\beta_0 (|z-z'|-2h)} \Bigg] dk$$

Fig. 5A (EQ.1)

$$E_\phi = \frac{P\rho_0 \sin\phi}{4\pi} \int_0^\infty \Bigg[ \bigg( \underbrace{\frac{\beta_0 J_1(kr)}{r(1 + R_L^{TM} e^{-2\beta_0 h})}}_{TM} - i\omega\mu_0 \underbrace{\frac{kJ_0(kr) - \frac{J_1(kr)}{r}}{\beta_0 \rho_0 (1 - R_A^{TE} R_L^{TE} e^{-2\beta_0 h})}}_{TE} \bigg) e^{-\beta_0 |z-z'|} +$$

$$\bigg( -\underbrace{\frac{\beta_0 J_1(kr)}{r(1 + R_L^{TM} e^{-2\beta_0 h})} R_L^{TM}}_{TM} - i\omega\mu_0 \sigma_0 \underbrace{\frac{kJ_0(kr) - \frac{J_1(kr)}{r}}{\beta_0 (1 - R_A^{TE} R_L^{TE} e^{-2\beta_0 h})} R_L^{TE}}_{TE} \bigg) e^{-\beta_0 (z+z')} +$$

$$\bigg( \underbrace{\frac{\beta_0 J_1(kr)}{r(1 + R_L^{TM} e^{-2\beta_0 h})}}_{TM} - i\omega\mu_0 \underbrace{\frac{kJ_0(kr) - \frac{J_1(kr)}{r}}{\beta_0 \rho_0 (1 - R_A^{TE} R_L^{TE} e^{-2\beta_0 h})} R_A^{TE}}_{TE} \bigg) e^{\beta_0 (z+z'-2h)} +$$

$$\bigg( -\underbrace{\frac{\beta_0 J_1(kr)}{r(1 + R_L^{TM} e^{-2\beta_0 h})} R_L^{TM}}_{TM} - i\omega\mu_0 \underbrace{\frac{kJ_0(kr) - \frac{J_1(kr)}{r}}{\beta_0 \rho_0 (1 - R_A^{TE} R_L^{TE} e^{-2\beta_0 h})} R_A^{TE} R_L^{TE}}_{TE} \bigg) e^{\beta_0 (|z-z'|-2h)} \Bigg] dk$$

Fig. 5B (EQ.2)

$$E_z = \frac{P\rho_0 \cos\phi}{4\pi} \int_0^\infty \frac{k^2 J_1(kr)}{1 + R_L^{TM} e^{-2\beta_0 h}} \Big[ \mp e^{-\beta_0 |z-z'|} - R_L^{TM} e^{-\beta_0 (z+z')} - e^{\beta_0 (z+z'-2h)} \mp R_L^{TM} e^{\beta_0 (|z-z'|-2h)} \Big] dk$$

Fig. 5C (EQ.3)

$$B_r = \frac{\mu_0 P \sin\phi}{4\pi} \int_0^\infty \Big[ \pm \Big( \underbrace{\frac{J_1(kr)}{r(1+R_L^{TM}e^{-2\beta_0 h})}}_{TM} + \underbrace{\frac{kJ_0(kr)-\frac{J_1(kr)}{r}}{1-R_A^{TE}R_L^{TE}e^{-2\beta_0 h}}}_{TE} \Big) e^{-\beta_0|z-z'|} +$$

$$\Big( \underbrace{\frac{J_1(kr)}{r(1+R_L^{TM}e^{-2\beta_0 h})}R_L^{TM}}_{TM} - \underbrace{\frac{kJ_0(kr)-\frac{J_1(kr)}{r}}{1-R_A^{TE}R_L^{TE}e^{-2\beta_0 h}}R_L^{TE}}_{TE} \Big) e^{-\beta_0(z+z')} +$$

$$\Big( \underbrace{\frac{J_1(kr)}{r(1+R_L^{TM}e^{-2\beta_0 h})}}_{TM} + \underbrace{\frac{kJ_0(kr)-\frac{J_1(kr)}{r}}{1-R_A^{TE}R_L^{TE}e^{-2\beta_0 h}}R_A^{TE}}_{TE} \Big) e^{\beta_0(z+z'-2h)} \pm$$

$$\Big( \underbrace{\frac{J_1(kr)}{r(1+R_L^{TM}e^{-2\beta_0 h})}R_L^{TM}}_{TM} - \underbrace{\frac{kJ_0(kr)-\frac{J_1(kr)}{r}}{1-R_A^{TE}R_L^{TE}e^{-2\beta_0 h}}R_A^{TE}R_L^{TE}}_{TE} \Big) e^{\beta_0(|z-z'|-2h)} \Big] dk$$

Fig. 5D (EQ.4)

$$B_\phi = \frac{\mu_0 P \cos\phi}{4\pi} \int_0^\infty \Big[ \pm \Big( \underbrace{\frac{kJ_0(kr)-\frac{J_1(kr)}{r}}{1+R_L^{TM}e^{-2\beta_0 h}}}_{TM} + \underbrace{\frac{J_1(kr)}{r(1-R_A^{TE}R_L^{TE}e^{-2\beta_0 h})}}_{TE} \Big) e^{-\beta_0|z-z'|} +$$

$$\Big( \underbrace{\frac{kJ_0(kr)-\frac{J_1(kr)}{r}}{1+R_L^{TM}e^{-2\beta_0 h}}R_L^{TM}}_{TM} - \underbrace{\frac{J_1(kr)}{r(1-R_A^{TE}R_L^{TE}e^{-2\beta_0 h})}R_L^{TE}}_{TE} \Big) e^{-\beta_0(z+z')} +$$

$$\Big( \underbrace{\frac{kJ_0(kr)-\frac{J_1(kr)}{r}}{1+R_L^{TM}e^{-2\beta_0 h}}}_{TM} + \underbrace{\frac{J_1(kr)}{r(1-R_A^{TE}R_L^{TE}e^{-2\beta_0 h})}R_A^{TE}}_{TE} \Big) e^{\beta_0(z+z'-2h)} \pm$$

$$\Big( \underbrace{\frac{kJ_0(kr)-\frac{J_1(kr)}{r}}{1+R_L^{TM}e^{-2\beta_0 h}}R_L^{TM}}_{TM} - \underbrace{\frac{J_1(kr)}{r(1-R_A^{TE}R_L^{TE}e^{-2\beta_0 h})}R_A^{TE}R_L^{TE}}_{TE} \Big) e^{\beta_0(|z-z'|-2h)} \Big] dk$$

Fig. 5E (EQ.5)

$$B_z = \frac{\mu_0 P \sin\phi}{4\pi} \int_0^\infty \frac{k^2 J_1(kr)}{\beta_0(1-R_A^{TE}R_L^{TE}e^{-2\beta_0 h})} \Big[ e^{-\beta_0|z-z'|} + R_L^{TE}e^{-\beta_0(z+z')} + R_A^{TE}e^{\beta_0(z+z'-2h)} + R_A^{TE}R_L^{TE}e^{\beta_0(|z-z'|-2h)} \Big] dk$$

Fig. 5F (EQ.6)

$$\frac{\partial E_x}{\partial x} + \frac{\partial E_y}{\partial y} = -\frac{P\rho_0 \cos\phi}{4\pi} \int_0^\infty k^2 \beta_0 \frac{J_1(kr)}{1+R_L^{TM}e^{-2\beta_0 h}} \left[ -e^{-\beta_0|z-z'|} + R_L^{TM}e^{-\beta_0(z+z')} - e^{\beta_0(z+z'-2h)} + R_L^{TM}e^{\beta_0(|z-z'|-2h)} \right] dk$$

Fig. 5G (EQ.7)

$$\frac{\partial B_y}{\partial x} - \frac{\partial B_x}{\partial y} = \mu_0 \frac{P\cos\phi}{4\pi} \int_0^\infty \frac{k^2 J_1(kr)}{1+R_L^{TM}e^{-2\beta_0 h}} \left[ \mp e^{-\beta_0|z-z'|} - R_L^{TM}e^{-\beta_0(z+z')} - e^{\beta_0(z+z'-2h)} \mp R_L^{TM}e^{\beta_0(|z-z'|-2h)} \right] dk$$

Fig. 5H (EQ.8)

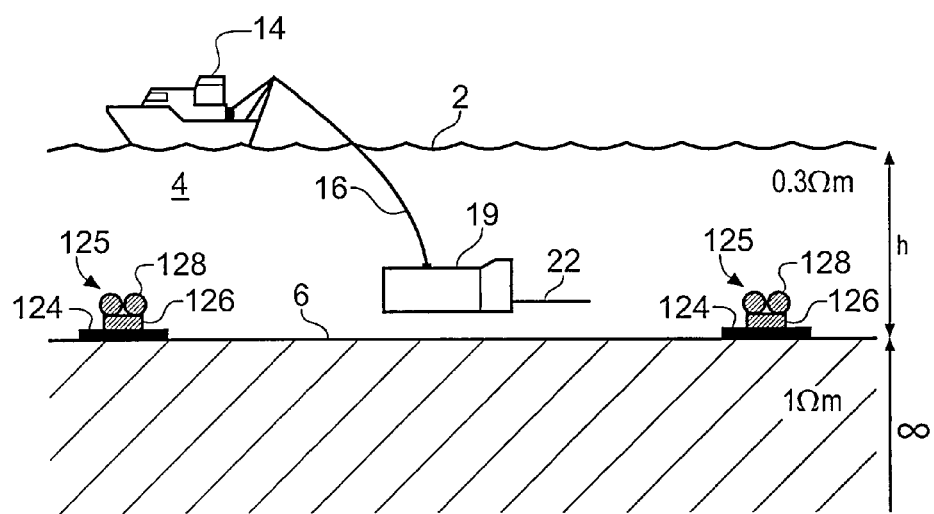

Fig. 6

$$\frac{\partial E_y}{\partial x} - \frac{\partial E_x}{\partial y} = -i\omega \frac{\mu_0 P \sin\phi}{4\pi} \int_0^\infty \frac{k^2 J_1(kr)}{\beta_0(1 - R_A^{TE} R_L^{TE} e^{-2\beta_0 h})} \Big[ e^{-\beta_0|z-z'|} + R_L^{TE} e^{-\beta_0(z+z')} +$$
$$R_A^{TE} e^{\beta_0(z+z'-2h)} + R_A^{TE} R_L^{TE} e^{\beta_0(|z-z'|-2h)} \Big] dk$$

Fig. 13A (EQ.9)

$$\frac{\partial B_x}{\partial x} + \frac{\partial B_y}{\partial y} = -\frac{\mu_0 P \rho_0 \sin\phi}{4\pi} \int_0^\infty \frac{k^2 J_1(kr)}{1 - R_A^{TE} R_L^{TE} e^{-2\beta_0 h}} \Big[ \pm e^{-\beta_0|z-z'|} - R_L^{TE} e^{-\beta_0(z+z')} + R_A^{TE} e^{\beta_0(z+z'-2h)} \mp$$
$$R_A^{TE} R_L^{TE} e^{\beta_0(|z-z'|-2h)} \Big] dk$$

Fig. 13B (EQ.10)

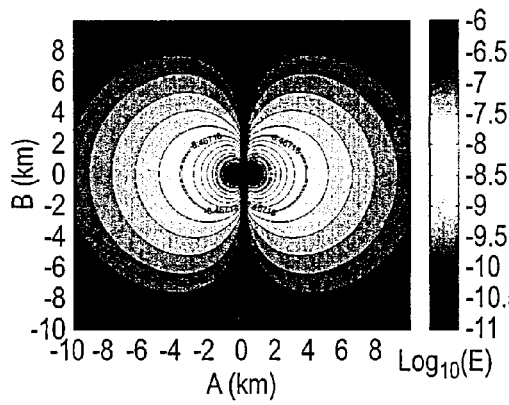 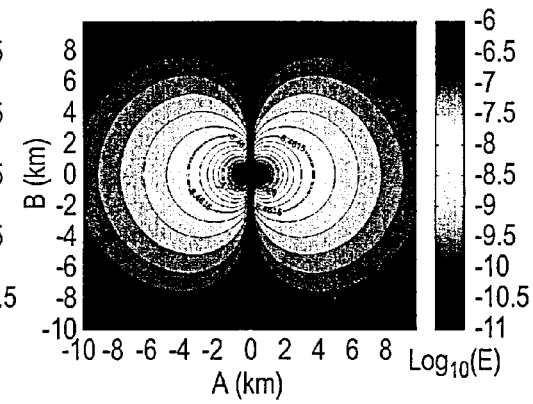
Fig. 15A　　　　　　　　Fig. 15B
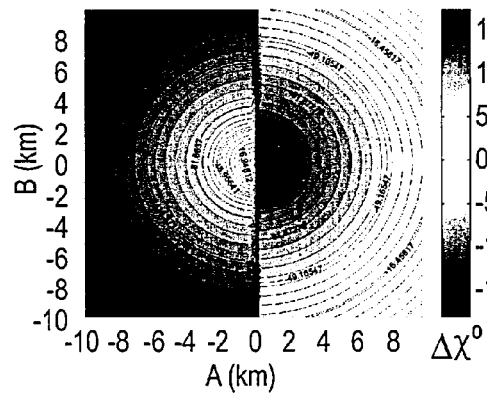 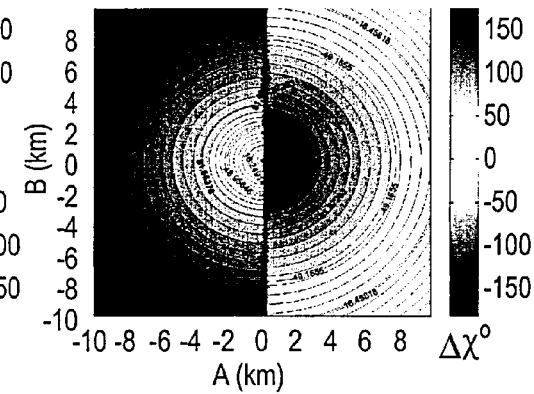
Fig. 15C　　　　　　　　Fig. 15D
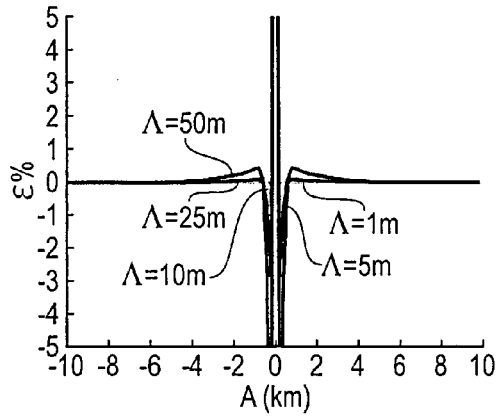 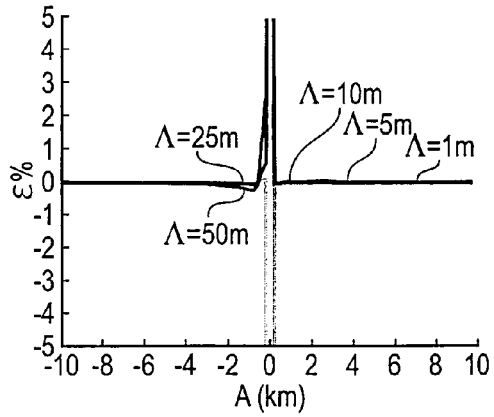
Fig. 16A　　　　　　　　Fig. 16B

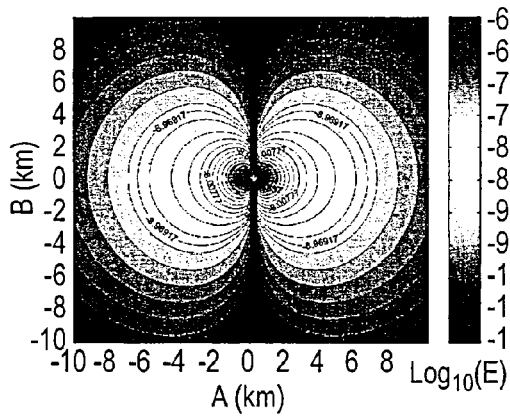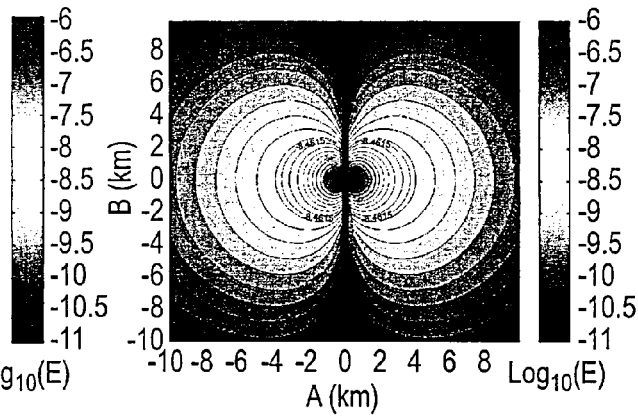
Fig. 17A    Fig. 17B
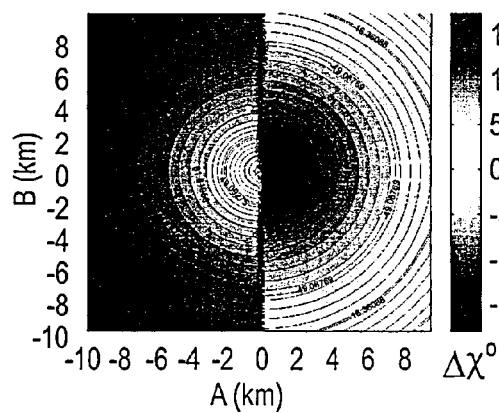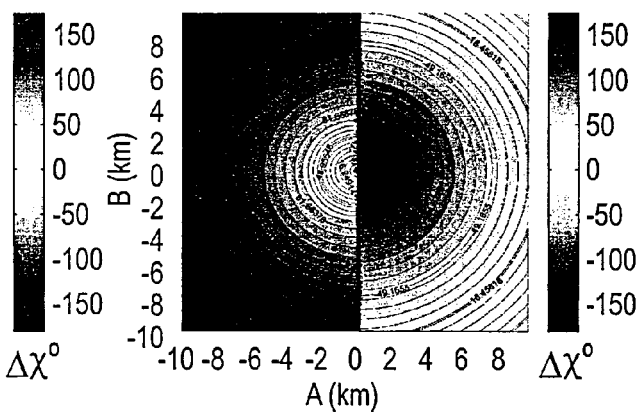
Fig. 18A    Fig. 18B
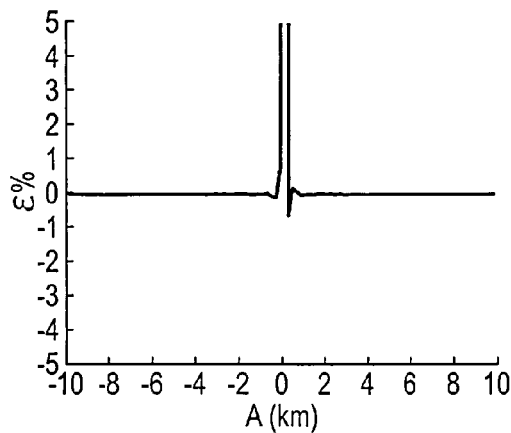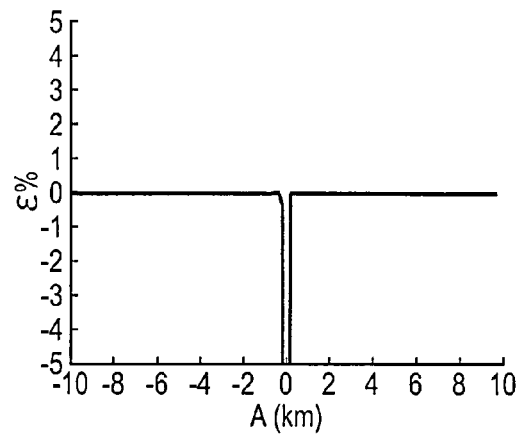
Fig. 19A    Fig. 19B

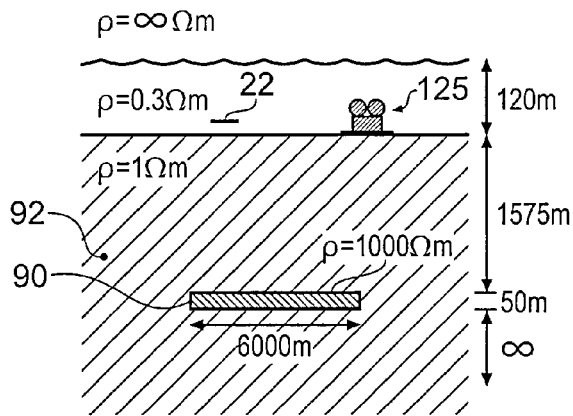
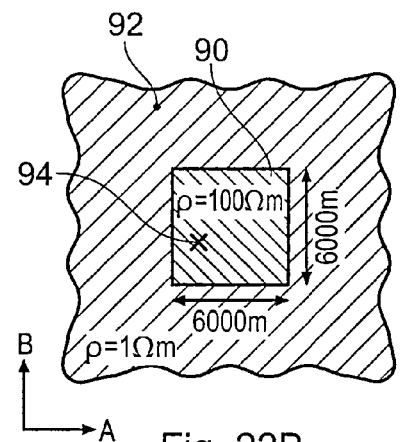
Fig. 22A     Fig. 22B
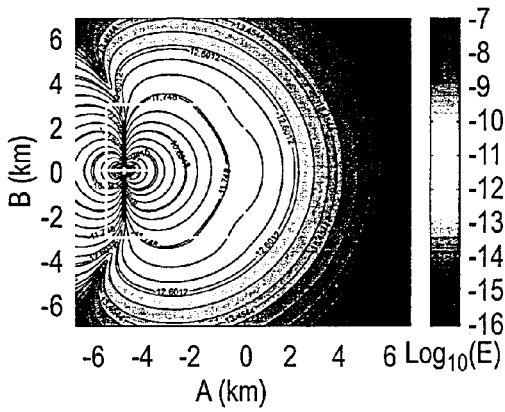
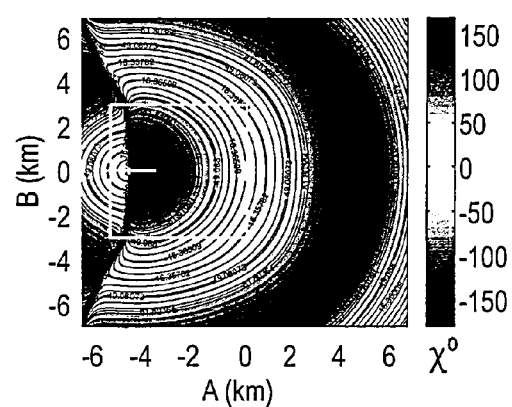
Fig. 23A     Fig. 23B
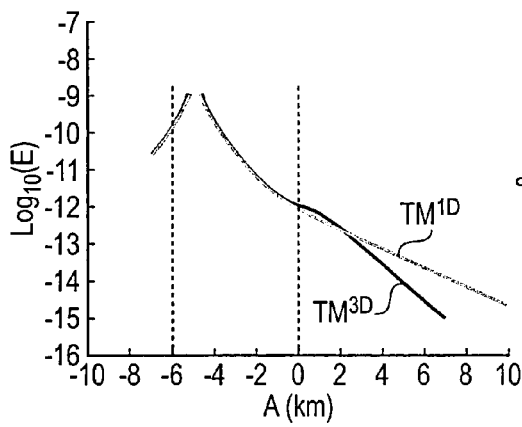
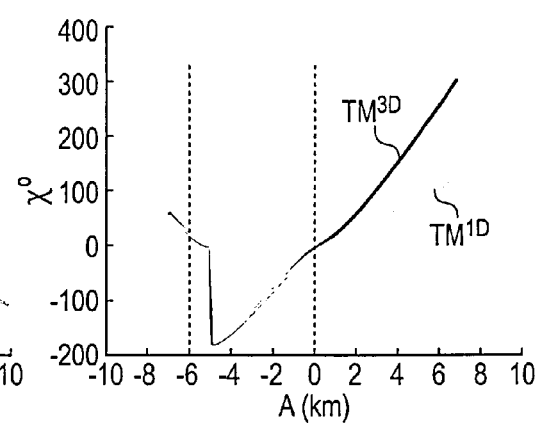
Fig. 24A     Fig. 24B

METHOD FOR MONITORING AN AREA CONTAINING A SUBTERRANEAN RESISTIVE OR CONDUCTIVE BODY, AND FOR OBTAINING A VOLUME OF HYDROCARBON THEREFROM

RELATED APPLICATION DATA

This application is a continuation of U.S. patent application Ser. No. 11/353,408 filed Feb. 14, 2006 now U.S. Pat. No. 7,362,102, which is hereby incorporated herein by reference in its entirety.

BACKGROUND OF THE INVENTION

The invention relates to seafloor electromagnetic surveying for resistive and/or conductive bodies, for example for oil and other hydrocarbon reserves or subterranean salt bodies.

FIG. 1 schematically shows a surface vessel 14 undertaking controlled source electromagnetic (CSEM) surveying of a subterranean strata configuration using standard techniques [1]. The subterranean strata configuration in this example includes an overburden layer 8, an underburden layer 9 and a hydrocarbon reservoir 12. The surface vessel 14 floats on the surface 2 of a body of water, in this case seawater 4 of depth h meters. A submersible vehicle 19 carrying a source in the form of a horizontal electric dipole HED transmitter 22 is attached to the surface vessel 14 by an umbilical cable 16. This provides an electrical and mechanical connection between the submersible vehicle 19 and the surface vessel 14. The HED transmitter is supplied with a drive current so that it broadcasts an HED electromagnetic (EM) signal into the seawater 4. The HED transmitter is positioned a height z' (typically around 50 meters) above the seafloor 6. The EM signals comprise transverse electric (TE) and transverse magnetic (TM) mode components.

One or more remote receivers 25 are located on the seafloor 6. Each of the receivers 25 include an instrument package 26, a detector 24, a floatation device 28 and a ballast weight (not shown). The detector 24 comprises an orthogonal pair of horizontal electric dipole detectors and an orthogonal pair of horizontal magnetic field detectors positioned a height z above the seafloor 6. Typically the detectors will lie on the seafloor so that z is in effect zero. The horizontal electric dipole detectors are sensitive to horizontal components of the electric fields induced by the HED transmitter in the vicinity of the receiver 25, and produce electric field detector signals therefrom. The horizontal magnetic field detectors are sensitive to horizontal components of the magnetic fields, for example the magnetic flux density, induced by the HED transmitter in the vicinity of the receiver 25, and produce magnetic field detector signals therefrom. The instrument package 26 records the detector signals for later analysis. Examples of suitable receivers are described by Constable [8] and U.S. Pat. No. 5,770,945 [9].

The HED transmitter 22 broadcasts EM signals that propagate outwards both into the overlying water column 4 and downwards into the seafloor 6 and the underlying strata 8, 9, 12. At practical frequencies for this method and given the typical resistivity of the respective media 4, 8, 9, 12, propagation occurs by diffusion of electromagnetic fields. The rate of decay in amplitude and the phase shift of the signal are controlled both by geometric spreading and by skin depth effects. Because in general the underlying strata 8, 9, 12 are more resistive than the seawater 4, skin depths in the underlying strata 8, 9, 12 are longer. As a result, electromagnetic fields measured by a receiver located at a suitable horizontal separation are dominated by those components of the transmitted EM signal which have propagated downwards through the seafloor 6, along within the underlying strata 8, 9, 12, and back up to the detector 24 rather than directly through the seawater 4.

A sub-surface structure which includes a hydrocarbon reservoir, such as the one shown in FIG. 1, gives rise to a measurable increase in the horizontal electric field component amplitudes measured at the receiver relative to a sub-surface structure having only water-bearing sediments. This is because hydrocarbon reservoirs have relatively high resistivities (typically 100 $\Omega$m) compared to other subterranean strata (typically 1 $\Omega$m) and so the EM signals are less attenuated. It is this enhancement in horizontal electric field amplitudes which has been used as a basis for detecting hydrocarbon reservoirs [1].

It is important when surveying for hydrocarbon reservoirs to carefully consider the orientation of the current flows induced by a transmitted EM signal. The response of seawater and subterranean strata (which will typically comprise planar horizontal layers) to EM signals is generally very different for TE mode components of the transmitted signal, which excite predominantly horizontal current flows, and TM mode components, which excite significant components of vertical current flow.

For TE mode components, the coupling between the layers comprising the subterranean strata is largely inductive. This means the presence of thin resistive layers (which are indicative of hydrocarbon reservoirs) does not significantly affect the EM fields detected at the surface as the large scale current flow pattern is not affected by the thin layer. On the other hand, for TM mode components, the coupling between layers includes a significant galvanic component (i.e. due to the direct transfer of charge between layers). For the TM mode even a thin resistive layer strongly affects the EM fields detected at the receiver since the large scale current flow pattern is interrupted by the resistive layer. It is known therefore that a significant component of the TM mode is required to satisfactorily perform an EM survey in the field of oil exploration.

However, sole reliance on the sensitivity of the TM mode components to the presence of a thin resistive layer can lead to ambiguities. The effects on detected EM fields arising from the presence of a thin resistive layer can be indistinguishable from the effects arising from other realistic large scale subterranean strata configurations. In order to resolve these ambiguities it is known to determine the response of the subterranean strata to both TM mode components (i.e. inductively coupled) and TE mode components (i.e. galvanically coupled) [1]. The TE mode is most sensitive to large scale subterranean structures, whereas the TM mode is more sensitive to thin resistive layers.

The HED transmitter 22 shown in FIG. 1 simultaneously generates both TE and TM mode components with the relative contribution of each mode to the signal at the receiver depending on the HED source-receiver orientation. At receiver locations which are broadside to the HED transmitter axis, the TE mode dominates the response. At receiver locations which are inline with the HED transmitter axis, the TM mode is stronger (although the TE mode is still present) [1, 2, 3, 4]. The response at receiver locations in both the inline and broadside configurations is governed by a combination of the TE and TM mode components, and these tend to work in opposition.

At inline receiver locations for a one-dimensional layered subterranean strata the electric fields induced at the receiver will be radial (i.e. parallel to a line joining the source to the receiver) while at broadside receiver locations they will be azimuthal (i.e. perpendicular to a line joining the source to the receiver). For in-between locations the direction of the induced electric fields will depend on the relative coupling between the transmitter and detector for the TE and TM modes, which will depend on the subterranean strata's resistivity structure, for example whether it contains a hydrocarbon layer. For this reason, with known surveying techniques it is important to measure the orientation of the detector so that the direction of the induced electric fields is known. However, it can be difficult to do this accurately which can lead to a significant source of error when interpreting data.

To determine the differing responses of subterranean strata to the TE and the TM modes it is known to rely on the geometric splitting of the modes, i.e. to collect electric field amplitude data for different source-receiver alignments. This approach provides complementary horizontal electric field amplitude data sets which are differently sensitive to the TE and TM mode components of the transmitted EM signals. During analysis, these complementary data sets are combined to reveal differences between the TE mode and TM mode coupling between the transmitter and the detector. These differences are indicative of the presence or not of a subterranean hydrocarbon reservoir.

A problem with the above described survey and analysis techniques is that they do not generally provide good results for surveys made in shallow waters. This is due to the presence of an 'airwave' component in the EM fields induced by the HED transmitter at the receiver. This airwave component is due to EM signals from the HED transmitter which interact with the air. Since air is non-conducting and hence causes little attenuation, the airwave component can dominate the fields at the receiver. The airwave component is principally due to the TE mode components. This is because the TE mode components are efficiently inductively coupled across the seawater-to-air interface. The TM mode components, on the other hand, do not couple well across this boundary and consequently do not contribute significantly to the airwave component. Because it has not interacted with the subterranean strata, the airwave component contains little information about subterranean resistivity. Accordingly, if the airwave contributes a significant component to the EM fields induced by the HED transmitter at the receiver, the sensitivity of the technique to subterranean resistivity structures, such as hydrocarbon reservoirs, is greatly reduced. The path of an example airwave component is schematically shown in FIG. 1 by a dotted line labeled AW. The magnitude of the airwave component is reduced as a function of separation between source and receiver only by geometric spreading. However, the airwave component is strongly attenuated by its passage through the conducting seawater. This means that in relatively deep water (large h) the airwave component is not very significant at the receiver and as such does not present a major problem. However in shallow water (small h), the airwave component does not pass through as much seawater and thus makes a larger contribution to the EM fields induced by the HED transmitter at the receiver. This contribution becomes greater still at increasing source-receiver horizontal separations. This is because (other than due to geometric spreading) the strength of the airwave component is relatively constant over a wide range of horizontal separations since any extra distance traveled by the airwave component is almost exclusively in the non-attenuating air. Other components of the EM fields induced by the HED at the receiver, such as those which pass through the subterranean strata and are of interest, travel through lower resistivity media and become increasing attenuated as they travel further. For these reasons, the airwave component tends to dominate the EM fields induced by the HED transmitter at the receiver for surveys made in shallow water, especially at large source-receiver horizontal separations.

The existence of the airwave as a dominant component of the detector signals limits the applicability of the above described surveying and analysis techniques. In shallow water the source-receiver separations over which the techniques can be applied is much reduced. This not only leads to a need to employ more receiver locations to adequately cover a given area, but also limits the depth beneath the seafloor to which the technique is sensitive. This can mean that a buried hydrocarbon reservoir in shallow water may not be detectable, even though the same reservoir would be detected in deeper water.

FIG. 2A is a graph schematically showing results of one-dimensional modeling of two example EM surveys of the kind shown in FIG. 1. One example corresponds to a survey performed in deep water (dotted line) and the other to a survey performed in shallow water (solid line). For each model survey the amplitude of a horizontal electric field component induced at the receiver in response to the HED EM transmitter is calculated per unit transmitter dipole moment and is plotted as a function of horizontal separation r between the HED transmitter and the receiver. For both model surveys, the subterranean strata configuration is a semi-infinite homogeneous half space of resistivity 1 $\Omega$m. In the deep-water example, the subterranean strata configuration is located beneath an infinite extent of seawater. In the shallow-water example, it is located beneath a 500-meter depth of seawater. In both cases the seawater has resistivity 0.3 $\Omega$m. The transmitter and receiver are separated along a line which runs through the axis of the HED transmitter (inline orientation). It is the component of detected electric field resolved along this direction which is plotted in FIG. 2A. The HED transmitter is driven by an alternating current (AC) drive signal at a frequency of 0.25 Hz.

The effect of the airwave component on the amplitude of EM fields induced by the HED transmitter at the receiver is clear. In the deep-water model survey, where there is no airwave component (because the water depth is infinite), the calculated electric field amplitude falls steadily with increasing horizontal separation. In the shallow-water model, however, where there is a strong airwave component, the rate of amplitude reduction sharply decreases at a source-receiver horizontal separation of about 5000 m.

FIG. 2B is a plot showing the ratio, p, of the two curves shown in FIG. 2A. The large deviations from unity seen in FIG. 2B highlight the difference between these curves. Since the only difference between the two model surveys is the presence or not of an airwave component, the ratio plotted in FIG. 2A effectively shows the relative strength of the airwave component in the detected signal compared to that which passes through the subterranean strata for the shallow-water model survey.

It is apparent from FIGS. 2A and 2B that at all but the very shortest horizontal separations (less that 1000 m) the detected electric field is significantly larger for the shallow-water model. For example, at a horizontal separation of 2500 m, the amplitude of the detected signal in the deep-water model survey is around $10^{-12}$ V/Am$^2$. In the shallow-water model survey it is higher at around $10^{-11.5}$ V/Am$^2$. This is due to the additional contribution of the airwave component. This level of increase shows that the airwave component has an amplitude more than double that of the component which has passed through the subterranean strata, and accordingly over two-thirds of the detector signal carries almost no information about the subterranean strata. At greater horizontal separations the airwave component dominates even more. In particular, it becomes especially pronounced beyond around 5000 m. At this point there is a break in the rate at which the detected electric field amplitude falls with increasing horizontal separation. At a horizontal separation of around 7000 m, the airwave component in the shallow-water example has an amplitude around twenty times greater than that of the signal which passes through the subterranean strata. This clearly imposes high requirements for the signal-to-noise ratio of data collected over these sorts of horizontal separations, as is generally the case when a small signal rides on a large background. It is apparent that the airwave significantly limits the usefulness of these surveying and analysis techniques in shallow water.

FIGS. 3A and 3B schematically show gray scale representations of the modeled sensitivity S of conventional CSEM surveying to resistivity structure beneath the seafloor for two different water depths. For FIG. 3A, the water depth h is infinite and for FIG. 3B it is 50 m. The model surveys are made at a transmission frequency of 0.25 Hz and the earth is assumed to be a uniform half-space of resistivity $\rho=1$ $\Omega$m. Sensitivity is plotted as a function of depth d below seafloor and separation r between source and receiver. In deep water (FIG. 3A) the depth d below the seafloor to which the CSEM survey data are sensitive increases with source-receiver separation (as a basic rule of thumb the data are sensitive to structure down to a depth of around half the source-receiver separation). The effect of the airwave in shallow water (FIG. 3B) is to decrease the depth to which the data are sensitive. As a consequence deep target detection becomes impossible.

One proposed solution to the problem of the airwave dominating shallow-water surveys has been to rely on measurements of the vertical electric field components [10]. This is because vertical electric field components are less affected by the airwave. However, in practice there can be difficulties with this approach in practical surveys. This is because measurements of vertical electric field are significantly more prone to motion induced noise than more conventional measurements of horizontal components.

SUMMARY OF THE INVENTION

According to a first aspect of the invention, there is provided a method of analyzing results from an electromagnetic survey of an area that is thought or known to contain a subterranean resistive or conductive body, comprising: providing horizontal electric or magnetic field data obtained by at least one receiver from at least one horizontal electric dipole transmitter; determining a horizontal gradient in a first component of the electric or magnetic field data along a first direction; determining a horizontal gradient in a second component of the electric or magnetic field data along a second direction; and combining the horizontal gradients along the first and second directions to generate combined response data.

In this case, references to horizontal indicate that a significant component, preferably a major component, of the respective signals should be aligned with the horizontal axes. It is not necessary that the signals are perfectly aligned to the horizontal axes, although close alignment is preferred to provide a strong signal and reduce the complexity of analysis, for example alignment within +/−30° is desirable.

The resistive or conductive body might be a body which is more resistive than surrounding strata, such as a hydrocarbon reservoir (e.g. oil, gas, methane hydrate) or salt body, or a body which is more conductive than surrounding strata, such as siliceous sediments.

The first component of the electric or magnetic field data may be the electric field strength parallel to the first direction with the second component being the electric field strength parallel to the second direction. The gradients may be combined by forming their sum.

Alternatively, the first component may be the magnetic field strength perpendicular to the first direction and the second component the magnetic field strength perpendicular to the second direction. The gradients may be combined by forming their difference.

By generating combined response data in the analysis, it is possible to analyze survey results taken in shallower water than has previously been possible. This is because the combined response data are less sensitive to transverse electric (TE) mode components which have propagated through air and which tend to dominate survey results analyzed with previous methods.

Combined response data of this kind are functionally similar to vertical derivatives in vertical components of electromagnetic field data. Accordingly, the combined response data provide similar benefits to those achievable with data from vertical electric field detectors, such as the benefits described in GB 2402745 A [10]. However, with the present invention, these advantages are achieved without relying on vertical electromagnetic field measurements. This is beneficial because, as noted above, vertical field measurements can be more susceptible to noise, particularly motion-induced noise caused by undersea water currents.

Furthermore, the combined response data are independent of the orientation of the first and second directions with respect to the transmitter dipole. This means it is not necessary to know the orientation of receivers used to collect the data from which the combined response data are derived.

The first and second directions may be orthogonal to one another. This provides combined response data which are particularly insensitive to the TE mode.

The horizontal gradients may be determined from measurements of electric or magnetic field made at horizontally separated locations. Alternatively, in accordance with the principle of reciprocity, the horizontal gradients may equally be determined from transmissions of electromagnetic field made at horizontally separated locations.

The method may further comprise providing background data specific to the area being surveyed and comparing the combined response data with the background data to obtain difference data sensitive to the presence of a subterranean resistive or conductive body.

This can be beneficial since the comparison of the combined response data with background data can help to determine whether features of the combined response data are indicative of a resistive or conductive body or arise as a result of some other local background structure configuration. Background data may be obtained by modeling the EM survey performed to obtain the combined response data with a model background subterranean strata configuration. The background model strata configuration should preferably be a close match to the actual background structure in the area being surveyed.

The background data may be obtained in several ways, for example from a controlled source electromagnetic survey, from a magneto-telluric electromagnetic survey, from another similar survey taken at a different time, or from a rock formation model. If a rock formation model is used it should preferably include resistivity, and may be derived from a combination of geological data and resistivity data. The geological data can be from seismological surveying and the resistivity data from well logging. Other sources of information, such as neutron data or other porosity estimates from well logs, could also be used.

In some examples, the background data may be obtained from electromagnetic field data similar to that used to generate the combined response data. This can be achieved by providing further horizontal electric or magnetic field data and combining the data in a different way. For example, by determining a horizontal gradient in a first component of the further electric or magnetic field data along a third direction; determining a horizontal gradient in a second component of the further electric or magnetic field data along a fourth direction; and combining the horizontal gradients along the third and fourth directions to generate the background data.

In this case, the first component of the further electric or magnetic field data may be the electric field strength perpendicular to the third direction and the second component the electric field strength perpendicular to the fourth direction. The horizontal gradients along the third and fourth directions may then be combined by forming their difference.

Alternatively, the first component of the further electric or magnetic field data may be the magnetic field strength parallel to the third direction and the second component the magnetic field strength parallel to the fourth direction. The horizontal gradients along the third and fourth directions may then be combined by forming their sum.

The third and fourth directions may be orthogonal to one another and they may also be the same as respective ones of the first and second directions.

The difference data may represent the difference between the combined response data and the background data as a function of position within the area surveyed, and the analysis may include identifying a location of a boundary of a subterranean resistive or conductive body.

According to a second aspect of the invention there is provided a computer program product bearing machine readable instructions for implementing a method of analyzing results from an electromagnetic survey according to the first aspect of the invention.

According to a third aspect of the invention there is provided a computer apparatus loaded with machine readable instructions for implementing the method of analyzing results from an electromagnetic survey according to the first aspect of the invention.

According to a fourth aspect of the invention there is provided a method of planning an electromagnetic survey of an area that is thought or known to contain a subterranean resistive or conductive body, comprising: creating a model of the area to be surveyed including a rock formation containing a postulated resistive or conductive body, and a body of water above the rock formation; setting values for water depth, depth of the postulated resistive or conductive body, and resistivity structure of the rock formation; and performing a simulation of an electromagnetic survey in the model of the survey area by calculating horizontal electric or magnetic field data obtained by at least one simulated receiver detecting signals from at least one simulated horizontal electric dipole transmitter; determining a horizontal gradient in a first component of the electric or magnetic field data along a first direction; determining a horizontal gradient in a second component of the electric or magnetic field data along a second direction; and combining the horizontal gradients along the first and second directions to generate combined response data.

The method may further comprise adjusting the model to remove the postulated resistive or conductive body and repeating the simulation to obtain background data for comparison with the combined response data.

Repeated simulations for a number of source-receiver horizontal separations and frequencies of signal can be performed in order to allow optimum surveying conditions in terms of source-to-receiver distance and frequency of EM signal for probing the resistive or conductive body to be selected when performing an electromagnetic survey. The effects and usefulness of differing receiver array configurations and transmitter tow paths can also be modeled.

Again, the resistive or conductive body might be a body which is more resistive than surrounding strata, such as a hydrocarbon reservoir.

According to a fifth aspect of the invention there is provided a computer program product bearing machine readable instructions for implementing the method of planning an electromagnetic survey according to the fourth aspect of the invention.

According to a sixth aspect of the invention there is provided a computer apparatus loaded with machine readable instructions for implementing the method of planning an electromagnetic survey according to the fourth aspect of the invention.

According to a seventh aspect of the invention there is provided an electromagnetic receiver for use in an electromagnetic survey of an area that is thought or known to contain a subterranean resistive or conductive body, wherein the receiver comprises two pairs of electric or magnetic dipole detectors, a first pair of which are separated along a first direction and a second pair of which are separated along a second direction, the first and second directions being horizontal when the receiver is in normal use.

The first pair of dipole detectors may be electric dipole detectors aligned with their axes substantially parallel to the first direction and the second pair of dipole detectors may be electric dipole detectors aligned with their axes substantially parallel to the second direction.

The first pair of dipole detectors may comprise at least three electrodes separated along the first direction and the second pair of dipole detectors may comprise at least three electrodes separated along the second direction.

Furthermore, a single common electrode may provide one of the electrodes of the first pair of dipole detectors and one of the electrodes of the second pair of dipole detectors.

Alternatively, the first pair of dipole detectors may be horizontal magnetic dipole detectors aligned with their axes substantially perpendicular to the first direction and the second pair of dipole detectors may be horizontal magnetic dipole detectors aligned with their axes substantially perpendicular to the second direction.

In this case, the first pair of dipole detectors may comprise a pair of coils with each coil arranged in a plane which is vertical when the receiver is in normal use and parallel to the first direction and the second pair of dipole detectors may comprise a pair of coils with each being arranged in a plane which is vertical when the receiver is in normal use and parallel to the second direction.

The first and second directions may be orthogonal to one another.

The receiver may further comprise two further pairs of electric or magnetic dipole detectors, a first pair of which are separated along a third direction and a second pair of which are separated along a fourth direction, the third and fourth directions being horizontal when the receiver is in normal use.

The first pair of further dipole detectors may be horizontal electric dipole detectors aligned with their axes substantially perpendicular to the third direction and the second pair of further dipole detectors may be horizontal electric dipole detectors aligned with their axes substantially perpendicular to the fourth direction.

Alternatively, the first pair of further dipole detectors may be magnetic dipole detectors aligned with their axes substantially parallel to the third direction and the second pair of further dipole detectors may be magnetic dipole detectors aligned with their axes substantially parallel to the fourth direction.

The third and fourth directions may be orthogonal to one another. Furthermore, the third and fourth directions may be the same as respective ones of the first and second directions.

Receivers of the seventh aspect of the invention may be used to provide data for analysis according to the first aspect of the invention.

According to an eighth aspect of the invention there is provided an electromagnetic survey method applied to a survey area that is thought or known to contain a subterranean resistive or conductive body, comprising: providing at least one transmitter and at least one receiver according to the seventh aspect of the invention for respective transmission and detection of electromagnetic signals; and obtaining electromagnetic field data by detection and/or transmission at a plurality of different locations over the survey area.

Such a survey method provides data which allow gradients in electric field data to be determined such that the data may be analyzed according to the methods of the first aspect of the invention.

According to a ninth aspect of the invention there is provided an electromagnetic source for use in an electromagnetic survey of an area that is thought or known to contain a subterranean resistive or conductive body, wherein the source comprises two pairs of electric or magnetic dipole transmitters, a first pair of which are separated along a first direction and a second pair of which are separated along a second direction, the first and second directions being horizontal when the source is in normal use.

The first pair of dipole transmitters may be aligned with their axes substantially parallel to the first direction and the second pair of dipole transmitters may be aligned with their axes substantially perpendicular to the second direction.

The first and second directions are orthogonal to one another.

Sources according to the ninth aspect of the invention may be used to provide data for analysis according to the first aspect of the invention.

According to an tenth aspect of the invention there is provided an electromagnetic survey method applied to a survey area that is thought or known to contain a subterranean resistive or conductive body, comprising: providing at least one source according the ninth aspect of the invention and at least one receiver for respective transmission and detection of electromagnetic signals; and obtaining electromagnetic field data by transmission and/or detection at a plurality of different locations over the survey area.

Such a survey method provides data which allow gradients in electric field data to be determined such that the data may be analyzed according to the methods of the first aspect of the invention.

BRIEF DESCRIPTION OF THE DRAWINGS

For a better understanding of the invention and to show how the same may be carried into effect reference is now made by way of example to the accompanying drawings, in which:

FIGS. 5A-5F show equations (Equations 1 to 6) corresponding to solutions to Maxwell's equations for an HED transmitter in a finite seawater layer overlying a one-dimensional subterranean resistivity structure for the radial (r), azimuthal ($\phi$) and vertical (z) components of the electric (E) and magnetic (B) fields;

FIG. 5G shows an equation (Equation 7) defining a linear combination of gradients in horizontal electric field data measured along orthogonal directions which is used in a method of analyzing survey data according to an embodiment of the invention;

FIG. 5H shows an equation (Equation 8) defining a linear combination of gradients in horizontal magnetic field data measured along orthogonal directions which is used in a method of analyzing survey data according to an embodiment of the invention;

FIG. 6 schematically shows in vertical section a surface vessel undertaking an EM survey according to an embodiment of the invention;

FIG. 13A shows an equation (Equation 9) defining a linear combination of gradients in horizontal electric field data measured along orthogonal directions which is used in a method of analyzing survey data according to an embodiment of the invention;

FIG. 13B shows an equation (Equation 10) defining a linear combination of gradients in horizontal magnetic field data measured along orthogonal directions which is used in a method of analyzing survey data according to an embodiment of the invention;

FIGS. 15A and 15B show schematic gray scale representations of the magnitude of modeled electric TM mode decomposition data obtained for the subterranean strata configuration shown in FIG. 11A for a practical detector and an idealized detector respectively;

FIGS. 15C and 15D show schematic gray scale representations of the phase of modeled electric TM mode decomposition data obtained for the subterranean strata configuration shown in FIG. 11A for a practical detector and an idealized detector respectively;

FIGS. 16A and 16B show percentage errors between TM mode decomposition data obtained at locations inline with a transmitter for a number of different practical detector configurations relative to an idealized detector;

FIGS. 17A and 17B show schematic gray scale representations of the magnitude of modeled electric TM mode decomposition data obtained for the subterranean strata configuration shown in FIG. 11A for an array of randomly oriented detectors and an array of aligned detectors respectively;

FIGS. 18A and 18B show schematic gray scale representations of the phase of modeled electric TM mode decomposition data obtained for the subterranean strata configuration shown in FIG. 11A for an array of randomly oriented detectors and an array of uniformly aligned detectors respectively;

FIGS. 19A and 19B show percentage errors between TM mode decomposition data obtained at locations inline with a transmitter for an array of randomly oriented detectors relative to an array of uniformly aligned detectors;

FIG. 22A schematically shows in vertical section a 3D model subterranean strata configuration;

FIG. 22B schematically shows in horizontal section the model subterranean strata configuration shown in FIG. 22A;

FIGS. 23A and 23B show schematic gray scale representations of the magnitude and phase of modeled electric TM mode decomposition data obtained for the subterranean strata configuration shown in FIG. 22A and for a similar model having a hydrocarbon reservoir of infinite horizontal extent;

FIGS. 24A and 24B schematically show the magnitude and phase of modeled TM mode decomposition data obtained at locations inline with a transmitter for the subterranean strata configuration shown in FIG. 22A and for a similar model having a hydrocarbon reservoir of infinite horizontal extent;

DETAILED DESCRIPTION

Figure 1:
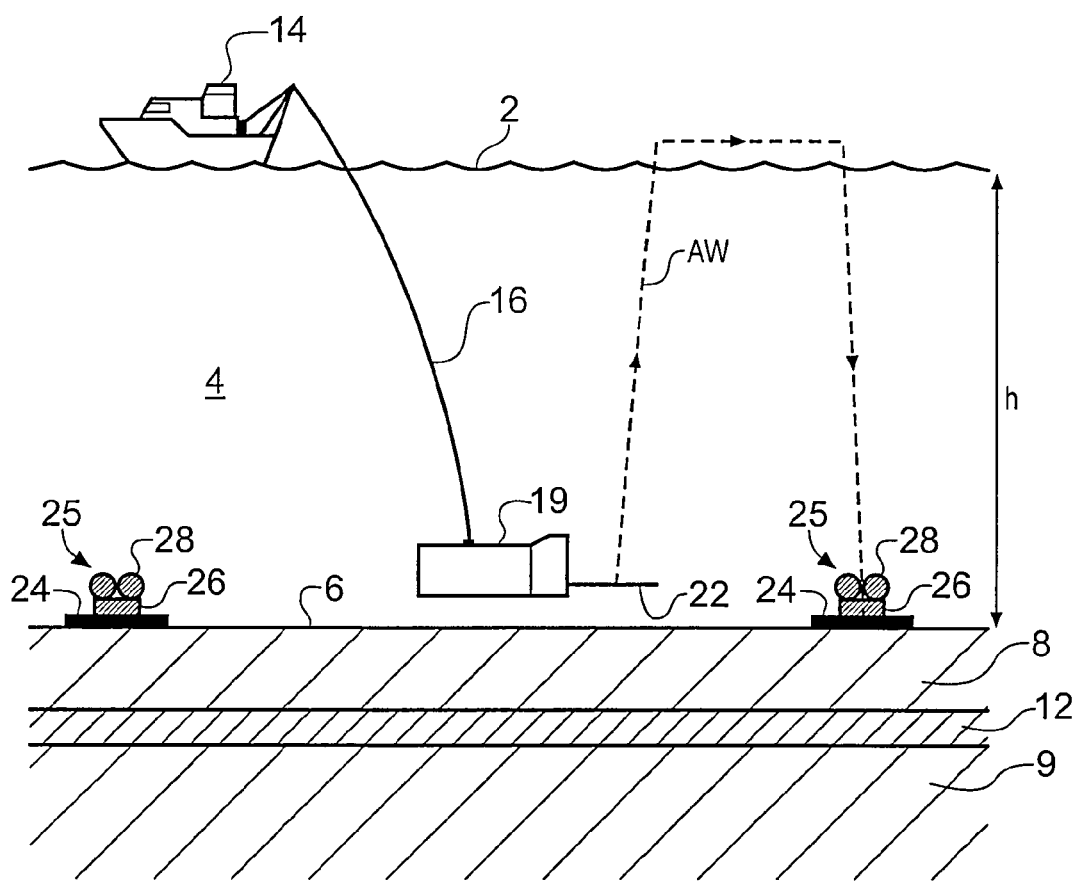
FIG. 1 shows in schematic vertical section a surface vessel undertaking an EM survey in deep water according to standard techniques.
Figure 2A:
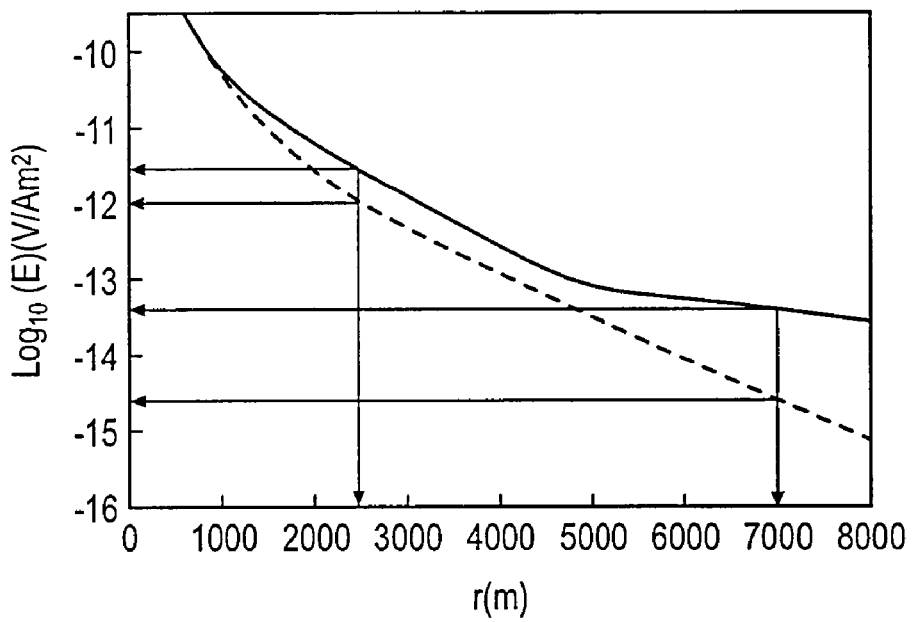
FIG. 2A is a graph plotting detector signals calculated from two model surveys analyzed according to the previously proposed method, one performed in deep water (dotted line) and one performed in shallow water (solid line)
Figure 2B:
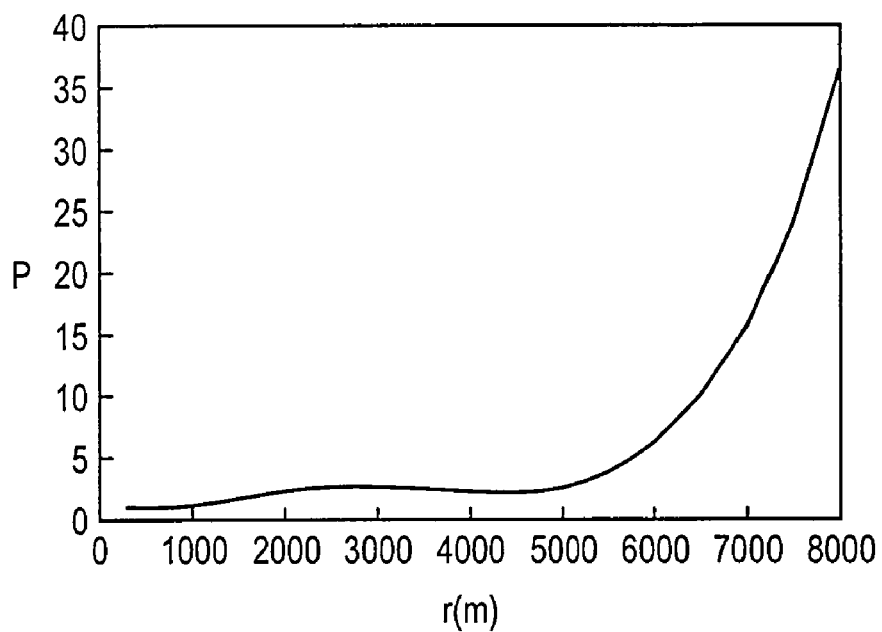
FIG. 2B is a graph plotting the ratio of the two curves shown in FIG. 2A.
Figure 3A:
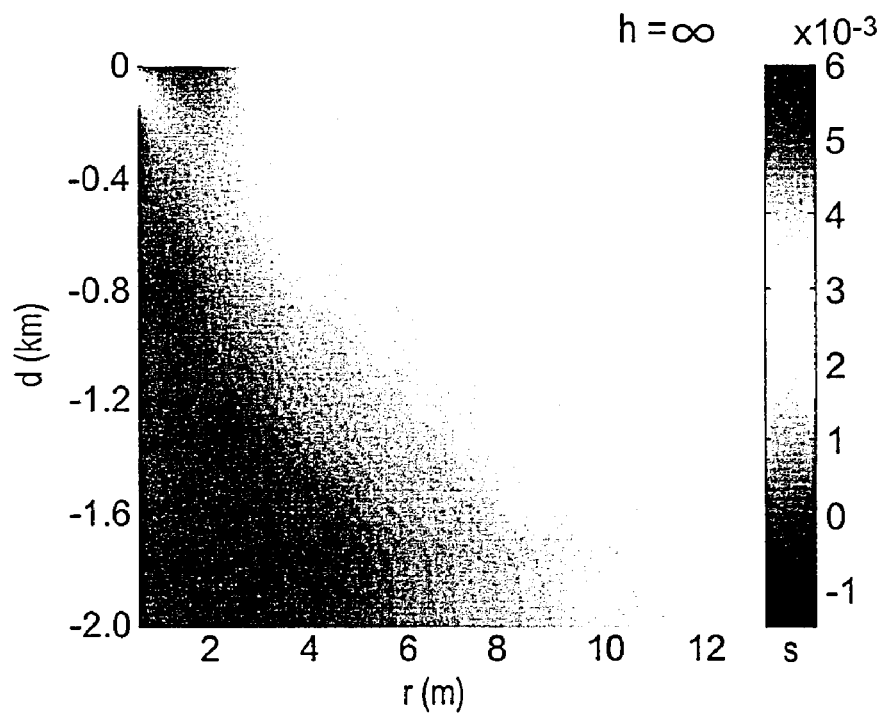
FIGS. 3A and 3B schematically show the sensitivity of a modeled CSEM survey to subterranean resistivity for two different water depths.
Figure 3B:
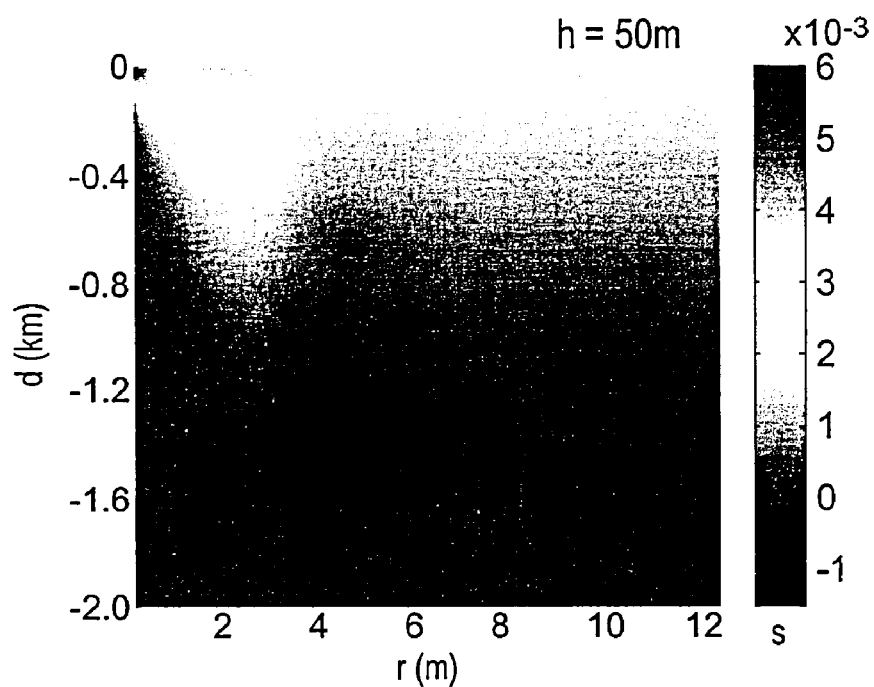
Figure 4:
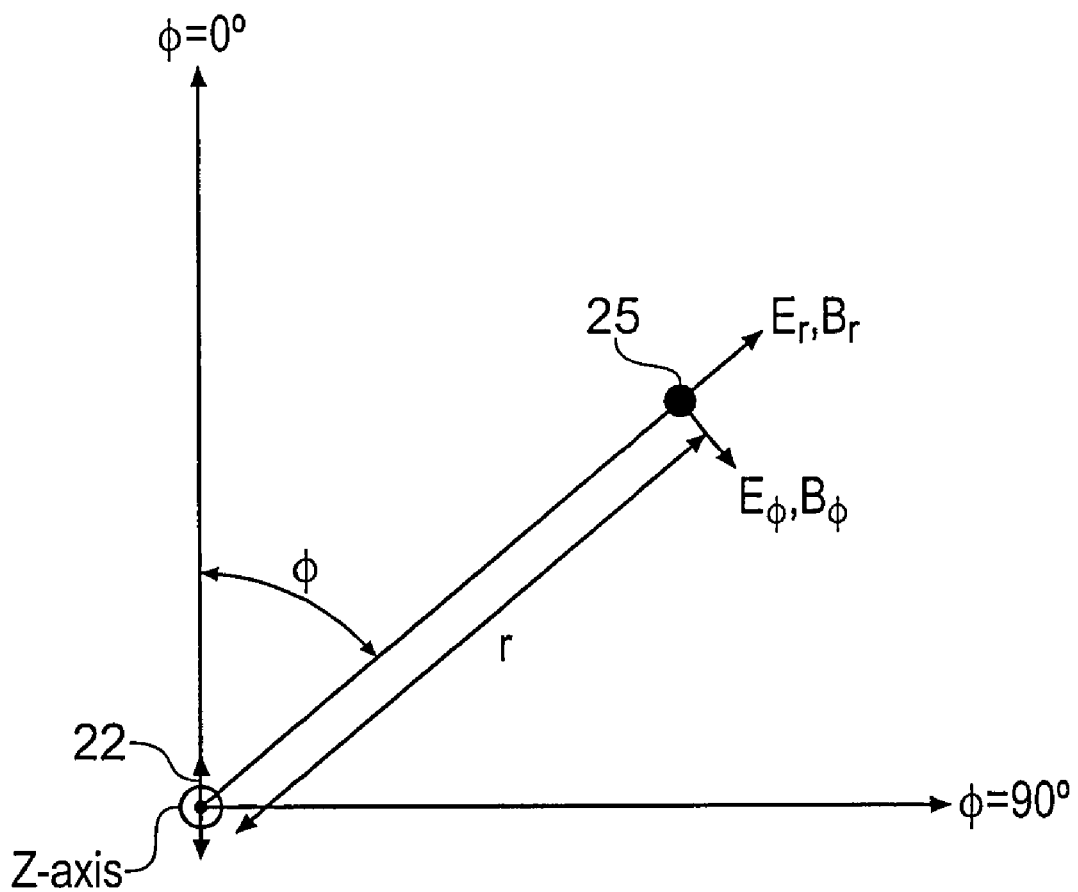
FIG. 4 is a plan view showing a cylindrical polar coordinate system.

FIG. 4 is a schematic plan view showing a co-ordinate system for describing the relative placement of an HED transmitter 22 and a receiver 25 of the kind shown in FIG. 1. The position of the receiver 25 with respect to the HED transmitter 22 is most suitably described in cylindrical polar co-ordinates, with the center of the HED transmitter 22 providing the origin of the co-ordinate system. The position of the receiver 25 is defined by an azimuthal angle $\phi$ and a separation distance (or range) r. The angle $\phi$ is measured clockwise from a line passing through, and running parallel to, the HED transmitter axis, as indicated in FIG. 4 by the line marked $\phi=0°$. A receiver placed along this line, i.e. such that is has an azimuthal angle $\phi$ of $0°$, is referred to as being in an inline or end-on position. A receiver with an azimuthal angle $\phi$ of $90°$, such that it lies on the line marked $\phi=90°$ in FIG. 4, is referred to as being in a broadside position. The electric field at a receiver may be considered to be resolved into a radial component $E_r$ and an orthogonal azimuthal component $E_\phi$, as indicated in the figure. The magnetic flux density at the receiver may similarly be considered to be resolved into a radial component $B_r$ and an orthogonal azimuthal component $B_\phi$. The axial co-ordinate z extends vertically away from the seafloor.

The fundamental equations governing electromagnetic induction in the earth are Maxwell's equations. At frequencies typically used in CSEM surveys displacement currents can be neglected to give: $\nabla \cdot \underline{B}=0$, $\nabla \cdot \underline{E}=0$, $\nabla \times \underline{E}+i\omega \underline{B}=0$ and $\nabla \times \underline{B} - i\omega v_0 \epsilon_0 \underline{E} = v_0 \underline{J}$, where $\underline{E}$ is the electric field strength, $\underline{B}$ is the magnetic flux density, $\sigma$ is the conductivity of the medium, $v_0$ is the magnetic permeability (assumed to take its free space value), $\epsilon_0$ is the electric permittivity of free space, $\underline{J}$ is the source current density, and a single Fourier component proportional to $e^{j\omega t}$ is considered. Maxwell's equations can be solved numerically in two- or three-dimensions for a point HED transmitter, however a closed form exists only for one-dimensional structures. Chave & Cox [7] derive a solution for the case of an HED transmitter in an infinite depth of seawater for a one-dimensional subterranean strata configuration (i.e. in which resistivity varies only in the vertical z-direction).

The inventors have performed an extension of the analysis presented in Chave & Cox [7] to model an HED transmitter in a finite depth h of seawater. Solving Maxwell's equations for an HED transmitter in a finite seawater layer overlying a one-dimensional subterranean resistivity structure provides equations for the radial (r), azimuthal ($\phi$) and vertical (z) components of the electric field (E) and magnetic flux density (B) as shown in FIGS. 5A to 5F. Although this modeling has been performed for a one-dimensional strata configuration, similar modeling may be performed in two- or three-dimensions.

Where the "$\pm$" or the "$\mp$" optional operator appears in these equation (or any other equations presented herein), the upper symbol is used when z'>z and the lower symbol when z'<z. In these equations, z' and z are the heights of the HED transmitter and detector above the seafloor respectively, h is the depth of the seawater, $\mu_0$ is the permeability of free space, P is the transmitter dipole moment, $$J_0(kr) = \sum_{l=0}^{\infty} \frac{(-1)^l}{2^{2l}(l!)^2}(kr)^{2l} \text{ and } J_1(kr) = \sum_{l=0}^{\infty} \frac{(-1)^l}{2^{2l+1}l!(1+l!)}(kr)^{2l+1}$$

are zeroth and first order Bessel functions respectively, $\rho_0$ is the resistivity of the seawater, k is a parameter analogous to the wave number in a Fourier integral, $$\beta_0 = \sqrt{k^2 - \frac{i\omega\mu_0}{\rho_0}},$$

$R_L^{TM}$ and $R_L^{TE}$ are coefficients defining the TM and TE mode interaction with the seafloor which depend on the resistivity structure of the subterranean strata configuration, and $R_A^{TE}$ is a coefficient defining the TE mode interaction with the air.

In the presentation of Equations 1, 2, 4 and 5 (which are the equations describing the horizontal components of the fields) in FIGS. 5A, 5B, 5D and 5E, the equations are shown split over four lines of text with each line of text having a left and a right component. The left component on each line is marked "TM" and results from the TM mode component of the transmitted signal and the right component is marked "TE" and results from the TE mode component of the transmitted signal.

As previously noted, the airwave component is principally due to the interaction of the TE mode with the air, i.e. determined by the $R_A^{TE}$ coefficient. As can be seen from Equations 1 and 2, $E_r$ and $E_\phi$ include both TM and TE components and so are affected by the airwave. This is why known methods of analyzing results from CSEM surveys based on electric field amplitude enhancement do not work well in shallow water.

Equation 7, shown in FIG. 5G, defines a linear combination of a gradient in electric field data along a first horizontal direction x (i.e. $\partial E_x/\partial x$) and a gradient in electric field data along a second orthogonal horizontal direction y (i.e. $\partial E_y/\partial y$) which is used in a method of analyzing results according to an embodiment of the invention.

Equation 8, shown in FIG. 5H, defines a linear combination of a horizontal gradient along the x-direction of magnetic field data measured along y (i.e. $\partial B_y/\partial x$) and a horizontal gradient along the y-direction of magnetic field data measured along x (i.e. $\partial B_x/\partial y$) used in a method of analyzing results according to another embodiment of the invention.

Combinations of electric or magnetic field data such as shown in FIGS. 5G and 5H are referred to as combined response data. It is noted that while the x- and y-directions are orthogonal to one another, their absolute orientation about a vertical z-axis is completely arbitrary. That is to say, the combined response data defined by the equations shown in FIGS. 5G and 5H do not depend on the actual directions along which the field data are measured, so long as the directions are orthogonal.

While the horizontal field components of electric field and magnetic flux density are both TM and TE dependant (see Equations 1, 2, 4 and 5), the combinations shown in Equations 7 and 8 depend only on the TM mode. For this reason the combined response data defined by Equations 7 and 8 are referred to as TM mode decomposition data. In particular, the TM mode decomposition shown in Equation 7 is referred to as electric TM mode decomposition data and the TM mode decomposition shown in Equation 8 is referred to as magnetic TM mode decomposition data.

Because the TM mode decomposition data does not include any dependence on the TE mode, the TM mode decomposition data are much less sensitive to the airwave component which prevents conventional analysis methods from working well in shallow water. For Equation 7, the lack of dependence on the TE mode is a consequence of the lack of dependence of Ez on the TE mode (see Equation 3), and the conservation of electric field flux in the absence of electric charges. That is to say, $$\nabla \cdot E = \frac{\partial Ex}{\partial x} + \frac{\partial Ey}{\partial y} + \frac{\partial Ez}{\partial z} = 0,$$

therefore $$\frac{\partial Ex}{\partial x} + \frac{\partial Ey}{\partial y} = -\frac{\partial Ez}{\partial z},$$

and because $$\frac{\partial Ez}{\partial z}$$

is TE independent (because Ez is TE independent), $$\frac{\partial Ex}{\partial x} + \frac{\partial Ey}{\partial y}$$

is also TE independent. Equation 8 is TE independent because $$\frac{\partial By}{\partial x} - \frac{\partial Bx}{\partial y} \propto Ez,$$

from the projection of Maxwell's equation for the curl of magnetic field onto the z-axis in the absence of displacement currents.

FIG. 6 schematically shows a surface vessel 14 undertaking controlled source electromagnetic (CSEM) surveying of a subterranean strata configuration using a survey method according to an embodiment of the invention. The surface vessel 14 floats on the surface 2 of a body of water, in this case seawater 4 of depth h meters. A submersible vehicle 19 carrying a source in the form of an HED transmitter 22 is attached to the surface vessel 14 by an umbilical cable 16 providing an electrical and mechanical connection between the submersible vehicle 19 and the surface vessel 14. The HED transmitter is supplied with a drive current so that it broadcasts an HED EM signal into the seawater 4. The HED transmitter is positioned a height z' (typically around 50 meters) above the seafloor 6. The surface vessel 14, submarine 19, umbilical 16 and HED transmitter 22 may be conventional.

One or more remote receivers 125 are located on the seafloor 6. Each of the receivers 25 includes an instrument package 126, a detector 124, a floatation device 128 and a ballast weight (not shown). Each detector is able to measure electric field gradients in two orthogonal horizontal directions to allow electric TM mode decomposition data as defined by Equation 7 to be obtained. In this example, the detectors are also able to measure magnetic field gradients in two orthogonal horizontal directions to allow magnetic TM mode decomposition data as defined by Equation 8 to be obtained. Examples of suitable detectors are described further below. The detectors are positioned at or just above the seafloor. The instrument package 126 records the signals from the detector for later analysis.

In FIG. 6, the survey takes place over a model background subterranean strata configuration. In this configuration the seawater has a resistivity of 0.3 Ωm and beneath the seafloor 6 is a uniform half-space sedimentary structure with a resistivity of 1 Ωm. The low resistivity of the sedimentary structure is primarily due to aqueous saturation of pore spaces. This sedimentary structure extends uniformly downwards for an infinite extent.

Figure 7A:
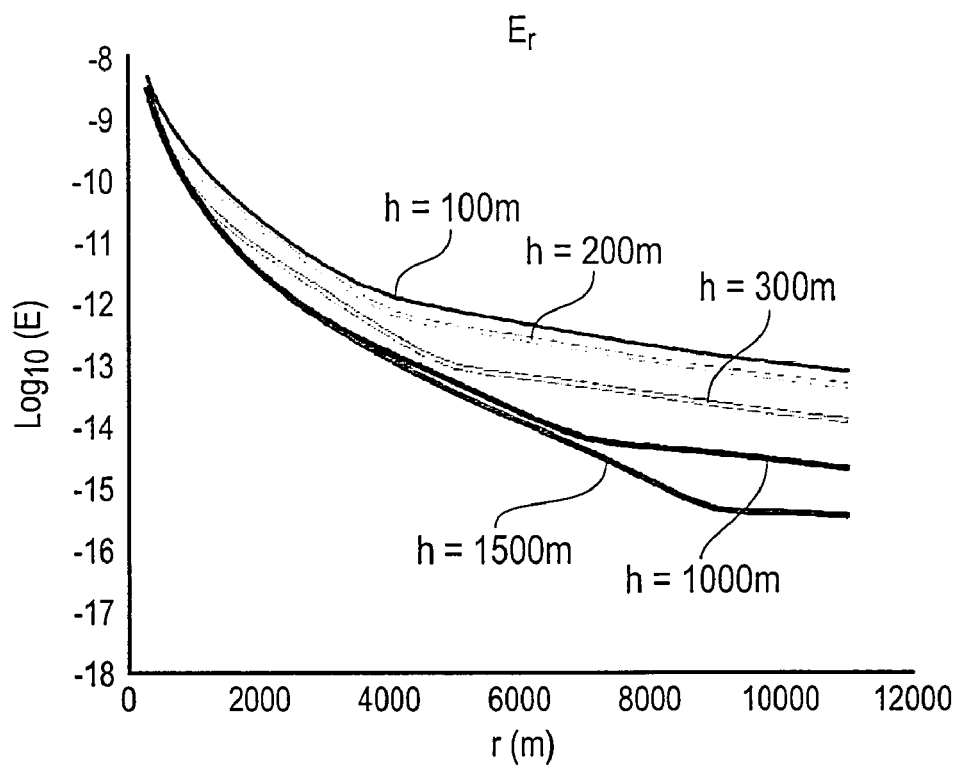
FIGS. 7A and 7B show the modeled amplitude and phase of the radial component of electric field data collected during a conventional EM survey of the model subterranean strata configuration shown in FIG. 6 for a range of water depths.

FIG. 7A is a graph schematically showing the logarithm of the modeled radial electric field component amplitude, $Log_{10}$ (E), seen at a receiver in an inline orientation (i.e. φ=0) in response to the HED transmitter broadcast signal as a function of separation, r, between the transmitter and the receiver. This is the field component previously used as the basis for the analysis of CSEM survey data and is shown here for comparison purposes. Curves are shown for a number of different water depths (H=1500 m, 1000 m, 500 m, 200 m and 100 m) as indicated on the figure. The HED transmitter is driven by an AC drive signal at a frequency of 0.25 Hz and the electric fields are calculated per unit transmitter electric dipole moment. FIG. 7A demonstrates how the radial component of the electric field given by Equation 1 becomes increasingly dominated by the airwave component of the transmitted signal in shallower water. For example, at a separation of around 9000 m, the calculated radial electric field is approximately 300-times greater in a water depth of 100 m than in a water depth of 1500 m. This is due to the increased relative contribution of the airwave component. Even at separations of only around 2000 m, the increased airwave contribution seen with a water depth of 100 m leads to radial electric fields which are around ten-times greater than those seen in deeper waters.

Figure 7B:
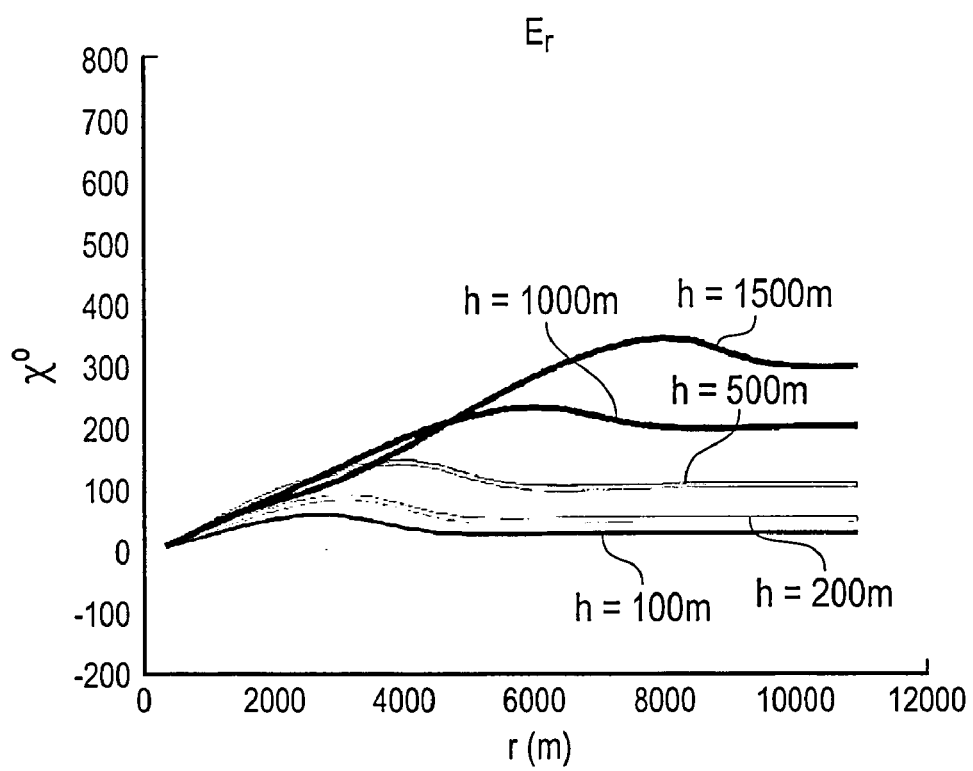

FIG. 7B is a graph schematically showing the phase, χ, relative to the HED transmitter AC drive signal, of the modeled radial electric field components plotted in FIG. 7A. It is apparent from FIG. 7B that with a finite water depth there is little advance in phase with increasing separation once the airwave component begins to dominate, for example at beyond around r=2000 m for h=100 m. This is because a dominant component of the signal is travelling rapidly through the non-conducting air.

Figure 7C:
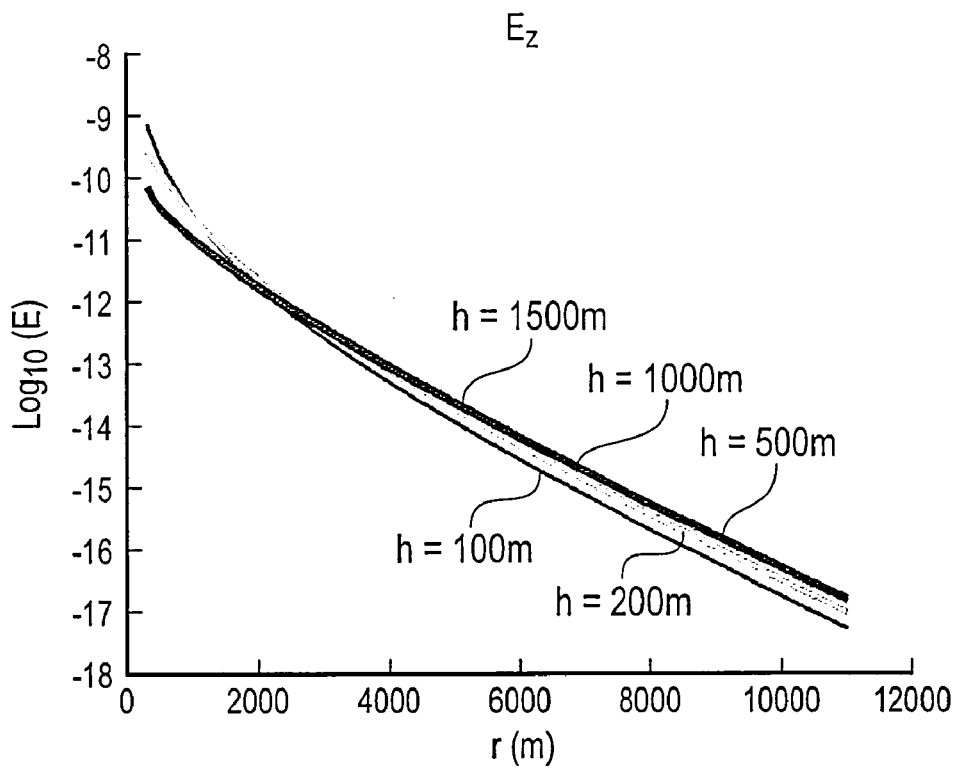
FIGS. 7C and 7D show the modeled amplitude and phase of the vertical component of electric field data collected during a previously proposed EM survey of the model subterranean strata configuration shown in FIG. 6 for a range of water depths.
Figure 7D:
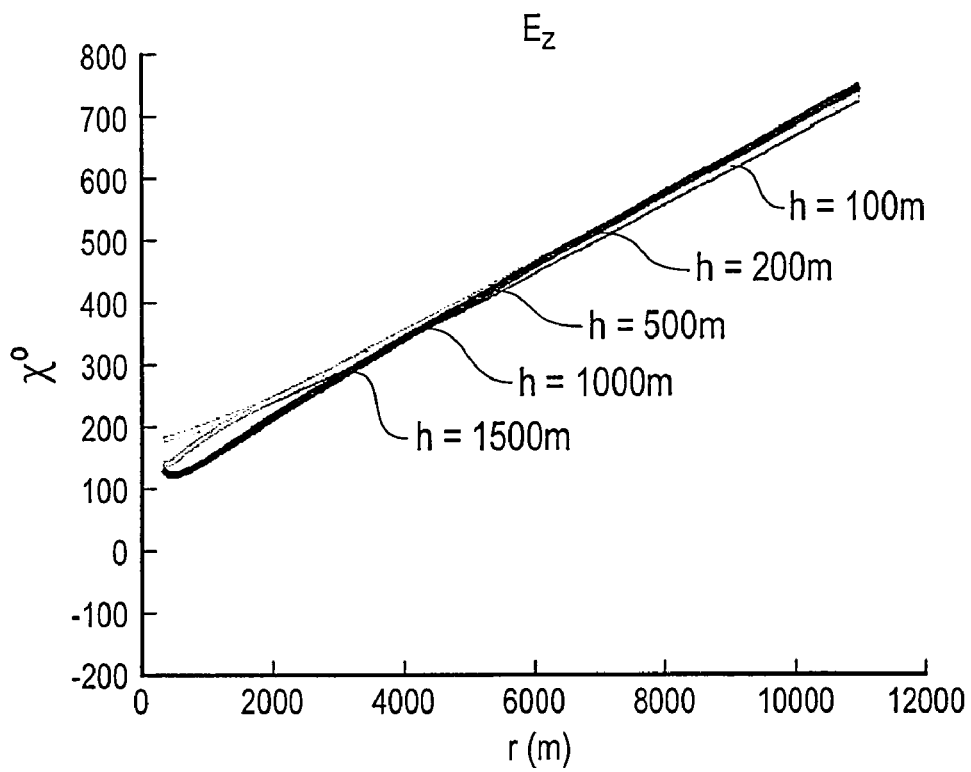

FIGS. 7C and 7D are similar to and will be understood from FIGS. 7A and 7B respectively. However, whereas FIGS. 7A and 7B show radial electric field data, FIGS. 7C and 7D show data for vertical components of electric field as a function of separation r. These curves show there is little dependence on water depth h for the vertical electric field component. It is for this reason that vertical electric field data have been previously proposed for shallow-water surveying [10].

Figure 7E:
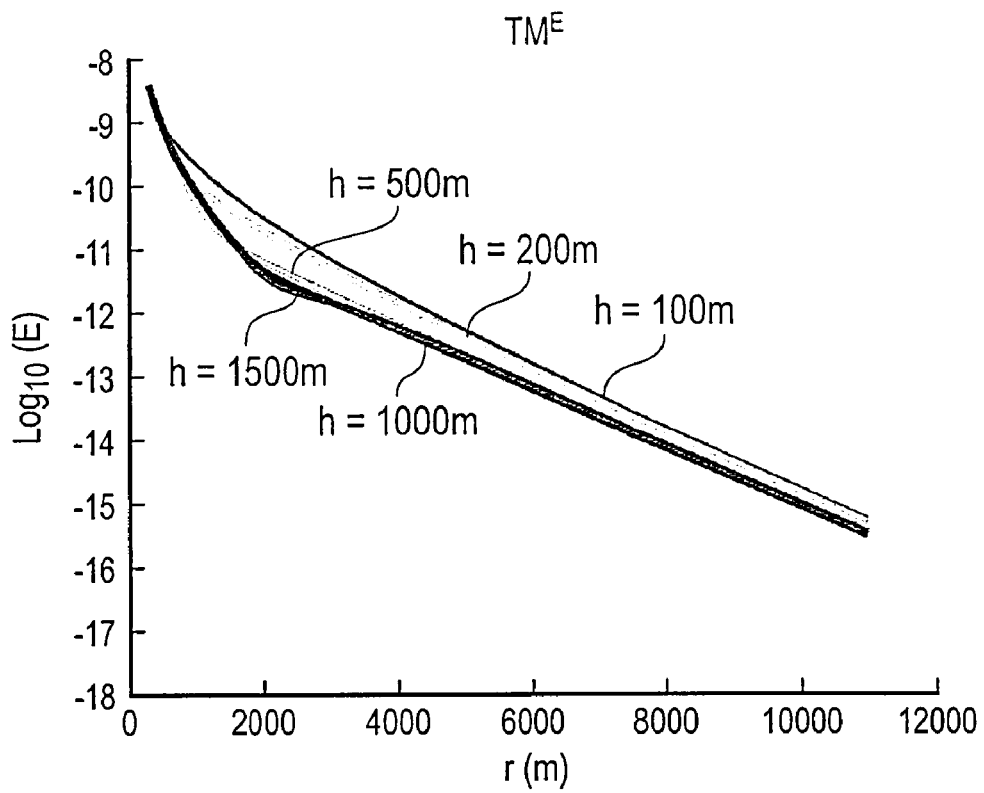
FIGS. 7E and 7F show the modeled amplitude and phase of a combination of horizontal gradients in electric field data collected during an EM survey of the model subterranean strata configuration shown in FIG. 6 which provides electric TM mode decomposition data according to an embodiment of the invention for a range of water depths.

FIG. 7E is a graph schematically showing the logarithm of the modeled electric TM mode decomposition given by Equation 7 seen at the receiver 125 in response to the HED transmitter broadcast signal multiplied by source-receiver separation, r, as a function of this separation for an inline orientation. For other azimuths φ, the curves would be functionally similar but scaled by a factor cos(φ). The multiplication by r provides for an equivalent electric field parameterization of the TM mode decomposition. As with FIGS. 7A and 7C, curves are calculated for a number of different water depths h. The HED transmitter is again driven by an AC drive signal at a frequency of 0.25 Hz and the TM mode decomposition calculated per unit transmitter electric dipole moment. It is clear from FIG. 7E that, unlike FIG. 7A, there is little difference between the curves for the different water depths. This reflects the fact that, as with the vertical component of electric field shown in FIG. 7C, the TM mode decomposition does not include a TE mode dependence which is the mode which contributes most to the airwave component.

Figure 7F:
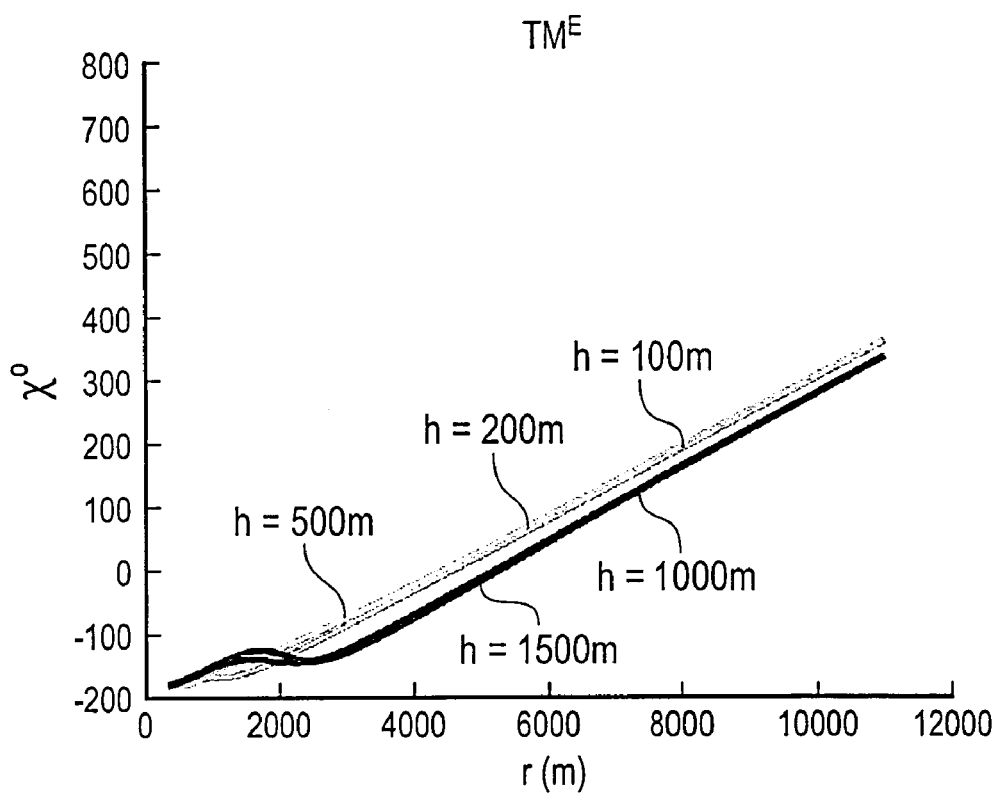

FIG. 7F is a graph schematically showing the phase, χ, relative to the HED transmitter AC drive signal, of the modeled TM mode decomposition plotted in FIG. 7E. It is apparent from FIG. 7F that the phase advances steadily with increasing separation for all water depths. This again demonstrates the insensitivity of the TM mode decomposition given by Equation 7 to the airwave component in shallow water.

Although not shown, curves similar to those shown in FIGS. 7E and 7F but calculated for the magnetic TM mode decomposition given by Equation 8 demonstrate the insensitivity of the magnetic TM mode decomposition to the airwave component also.

The insensitivity of the TM mode decompositions to the airwave component in shallow water has been seen for the model background subterranean strata configuration shown in FIG. 6. However, this model does not contain a hydrocarbon reservoir. It is, therefore, important to show that the TM mode decompositions are sensitive to the presence of a hydrocarbon reservoir if they are to be of practical use.

Figure 8:
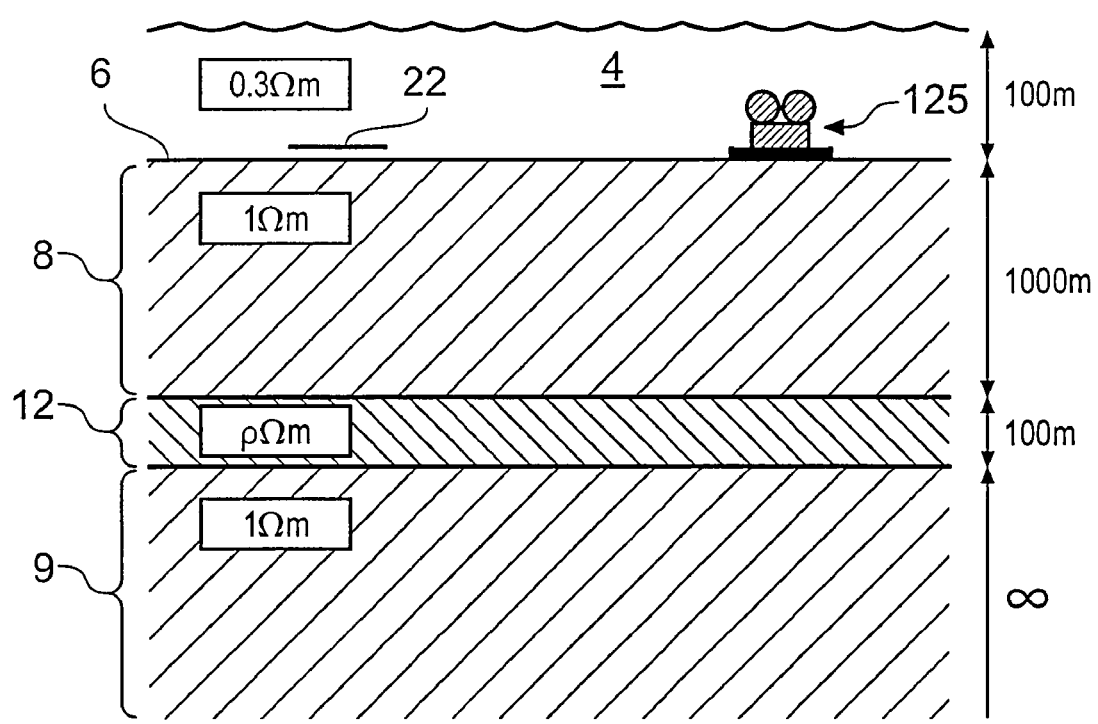
FIG. 8 shows in schematic vertical section a model hydrocarbon-reservoir bearing subterranean strata configuration.

FIG. 8 shows in schematic vertical section a model hydrocarbon-reservoir subterranean strata configuration. A section of seafloor 6 lies beneath a 100 m depth of seawater 4 which has a resistivity of 0.3 Ωm. The strata configuration beneath the seafloor 6 comprises a 1000 m thick overburden layer 8, representing sediments, arranged above a hydrocarbon reservoir 12. The overburden layer 8 has a resistivity of 1 Ωm, again, primarily due to aqueous saturation of pore spaces. The hydrocarbon reservoir 12 is 100 m thick, and has a resistivity of ρ Ωm. This resistivity will typically be greater than that of the surrounding layers due to the presence of non-conducting hydrocarbon within pore spaces. Below the hydrocarbon reservoir 12 is a sedimentary underburden layer 9, which, as for the overburden layer, has a resistivity of 1 Ωm. The underburden layer extends downwardly for an effectively infinite extent. Accordingly, except for the presence or absence of the hydrocarbon reservoir 12, the hydrocarbon-reservoir subterranean strata configuration of FIG. 8 is identical to the background subterranean strata configuration of FIG. 6 for the case h=100 m. An HED transmitter 22 and a receiver 125 are again shown.

Figure 9A:
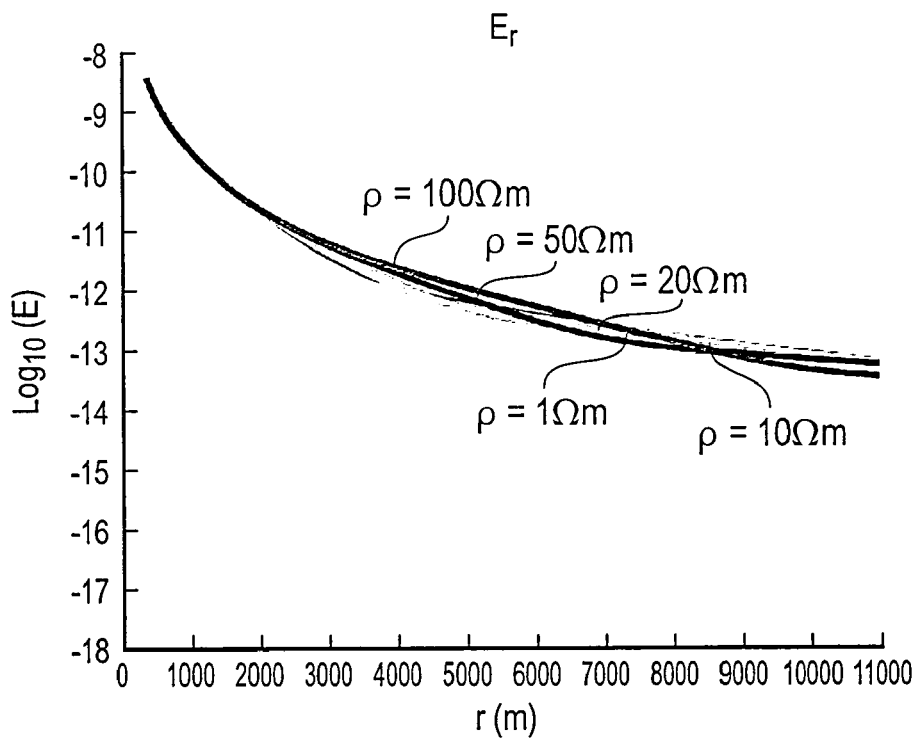
FIGS. 9A and 9B show the modeled amplitude and phase of the radial component of electric field data collected during a conventional EM survey of the model subterranean strata configuration shown in FIG. 8 for a range of hydrocarbon reservoir resistivities.

FIG. 9A is a graph schematically showing the logarithm of the modeled radial electric field component amplitude, $Log_{10}$ (E), seen at a receiver in response to the HED transmitter broadcast signal as a function of separation, r, between the transmitter and the receiver with the hydrocarbon-reservoir subterranean reservoir shown in FIG. 8. This conventionally used field component is again shown for comparison purposes. Curves are calculated for a number of different resistivities ρ for the hydrocarbon reservoir (ρ=1 Ωm (i.e. effectively no detectable reservoir), 10 Ωm, 20 Ωm, 50 Ωm and 100 Ωm) as indicated on the figure. The HED transmitter is again driven by an AC drive signal at a frequency of 0.25 Hz and the electric fields are calculated per unit transmitter electric dipole moment. The curves shown in FIG. 9A are all very similar to one another, even though there is a wide range of reservoir resistivities. This is because with a water depth of only 100 m, the radial electric field component is dominated by the airwave component of the TE mode and cannot be used to properly identify the presence or not of a hydrocarbon reservoir.

Figure 9B:
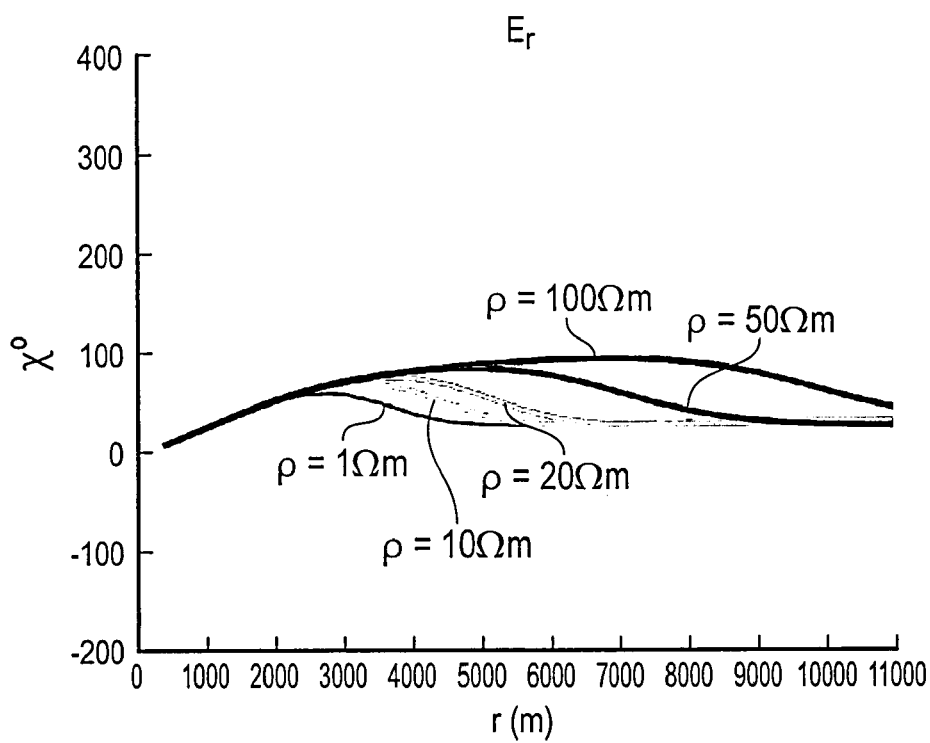

FIG. 9B is a graph schematically showing the phase, χ, relative to the HED transmitter AC drive signal, of the modeled radial electric field components plotted in FIG. 9A. It is apparent from FIG. 9B that there is little advance in phase with increasing separation for all reservoir resistivities. This is again because a dominant component of the transmitted signal is travelling through the non-conducting air.

Figure 9C:
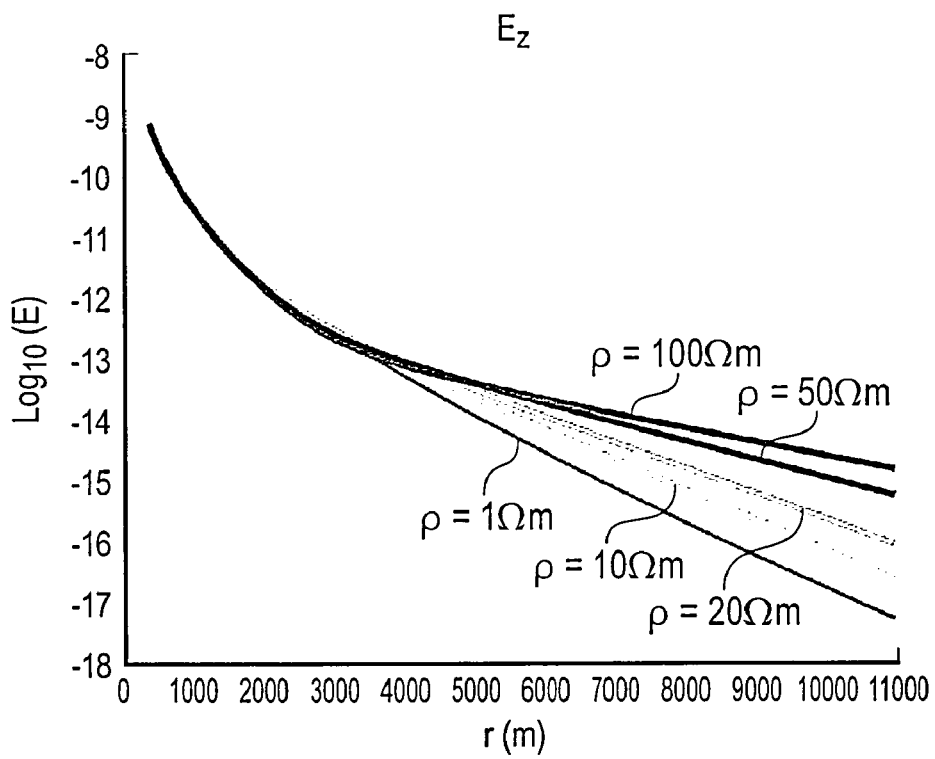
FIGS. 9C and 9D show the modeled amplitude and phase of the vertical component of electric field data collected during a previously proposed EM survey of the model subterranean strata configuration shown in FIG. 8 for a range of hydrocarbon reservoir resistivities.
Figure 9D:
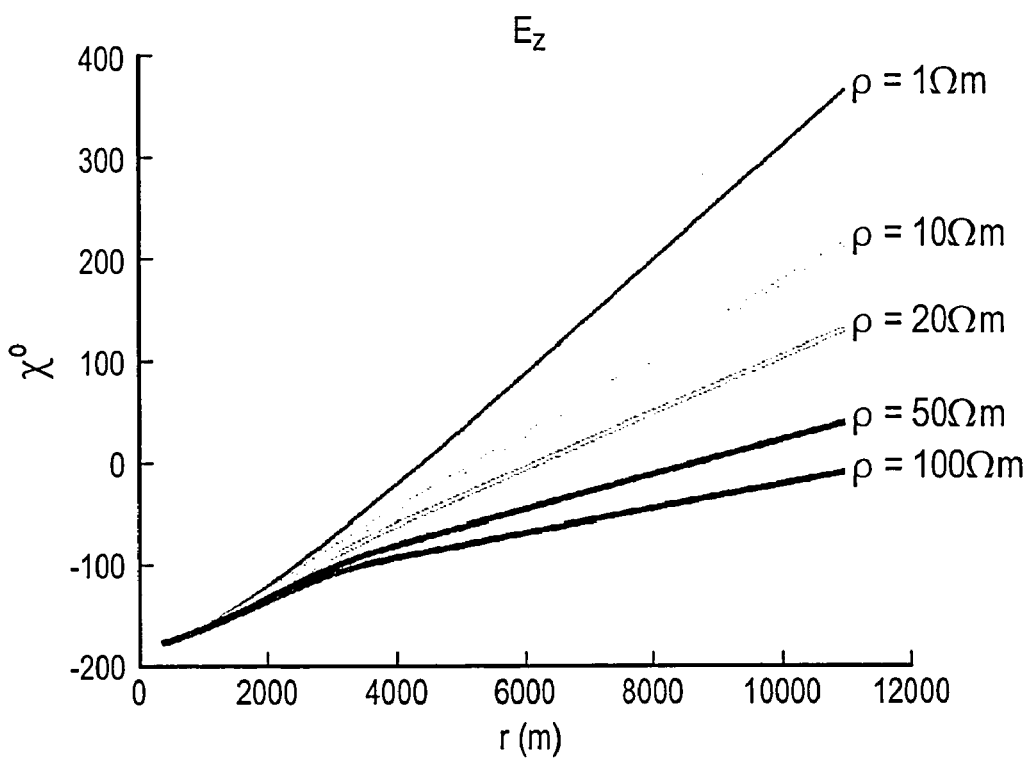

FIGS. 9C and 9D are similar to and will be understood from FIGS. 9A and 9B respectively. However, whereas FIGS. 9A and 9B show radial electric field data, FIGS. 9C and 9D show data for vertical components of electric field. These curves show that unlike the radial electric field data, the vertical electric field data are sensitive to hydrocarbon-reservoir resistivity. It is again for this reason that vertical electric field data have been previously proposed for shallow-water surveying [10].

Figure 9E:
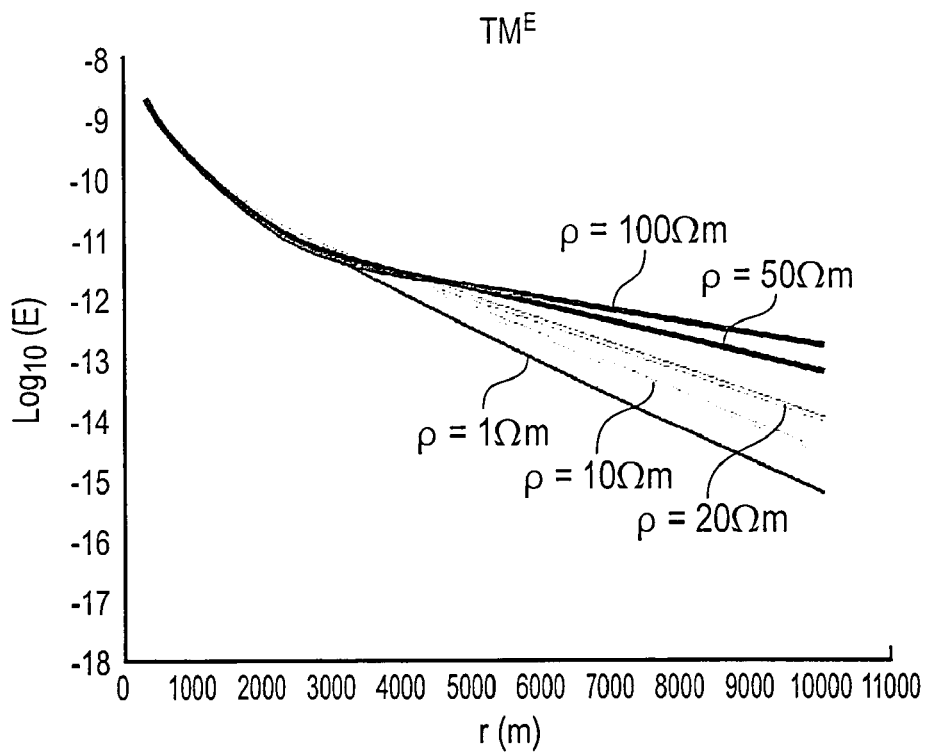
FIGS. 9E and 9F show the modeled amplitude and phase of a combination of horizontal gradients in electric field data collected during an EM survey of the model subterranean strata configuration shown in FIG. 8 which provides electric TM mode decomposition data according to an embodiment of the invention for a range of hydrocarbon reservoir resistivities.

FIG. 9E is a graph schematically showing the logarithm of the modeled electric TM mode decomposition seen at the receiver 125 in response to the HED transmitter 22 broadcast signal multiplied by source-receiver separation as a function of this separation for the hydrocarbon-reservoir subterranean strata configuration of FIG. 8. As before, the multiplication by r provides an equivalent electric field parameterization of the TM mode decomposition. As with FIG. 9A, curves are calculated for a number of different hydrocarbon reservoir resistivities. The HED transmitter is again driven by an AC drive signal at a frequency of 0.25 Hz and the TM mode decomposition calculated per unit transmitter electric dipole moment. It is clear from FIG. 9E that, unlike the airwave dominated radial electric field curves of FIG. 9A, there is a strong dependence in the calculated response of the TM mode decomposition on the resistivity of the hydrocarbon reservoir, even though the seawater depth is only 100 m. Furthermore, unlike the data shown in FIG. 9C, this sensitivity to hydrocarbon reservoir is achieved without the use of vertical dipole detectors which are prone to noise. In effect, the TM mode decomposition data are functionally similar to vertical electric field data, but are obtained from horizontal measurements of electric field.

For a hydrocarbon-reservoir resistivity of ρ=100 Ωm, the TM mode decomposition signal is around 300-times greater at a separation of r=11000 m than for the case ρ=1 Ωm (i.e. effectively no detectable hydrocarbon reservoir). This clearly demonstrates the sensitivity of the electric TM mode decomposition to the presence or not of a hydrocarbon reservoir.

Figure 9F:
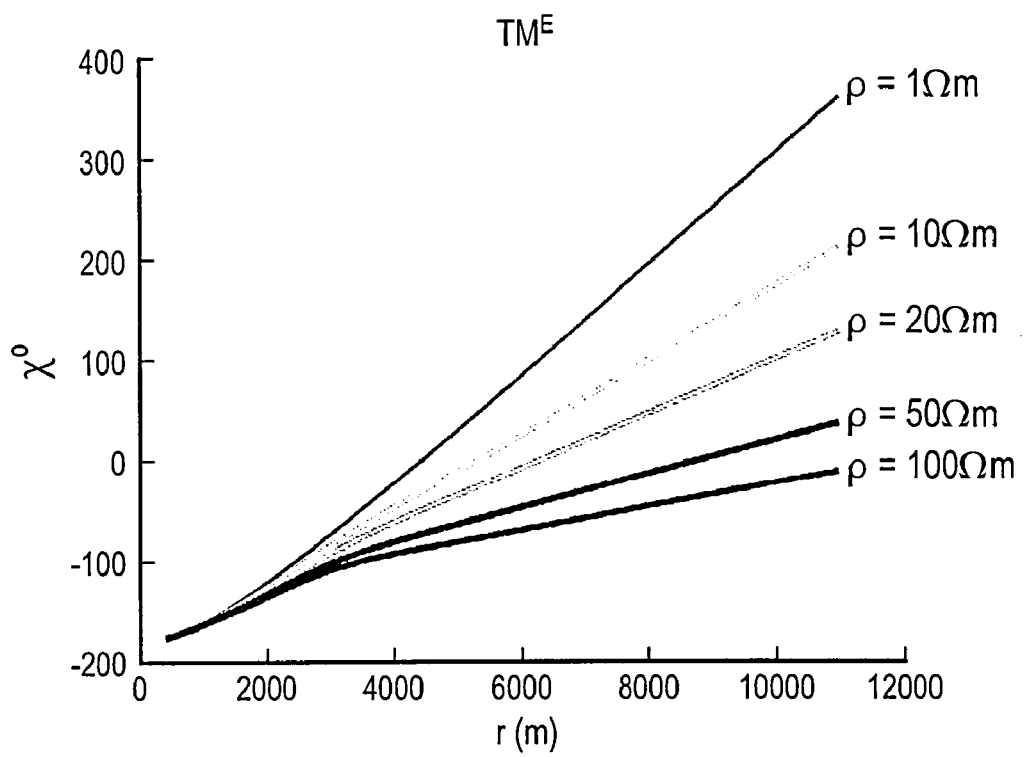

FIG. 9F is a graph schematically showing the phase, χ, relative to the HED transmitter AC drive signal, of the modeled TM mode decomposition plotted in FIG. 9E. It is apparent from FIG. 9B that the phase advances at different rates for different hydrocarbon-reservoir resistivities. This again demonstrates the sensitivity of the electric TM mode decomposition given by Equation 7 to the presence of a hydrocarbon reservoir.

Although again not shown, curves similar to those shown in FIGS. 9E and 9F but calculated for the TM mode decomposition given by Equation 8 also demonstrate the sensitivity of the magnetic TM mode decomposition to the hydrocarbon reservoir.

Figure 10A:
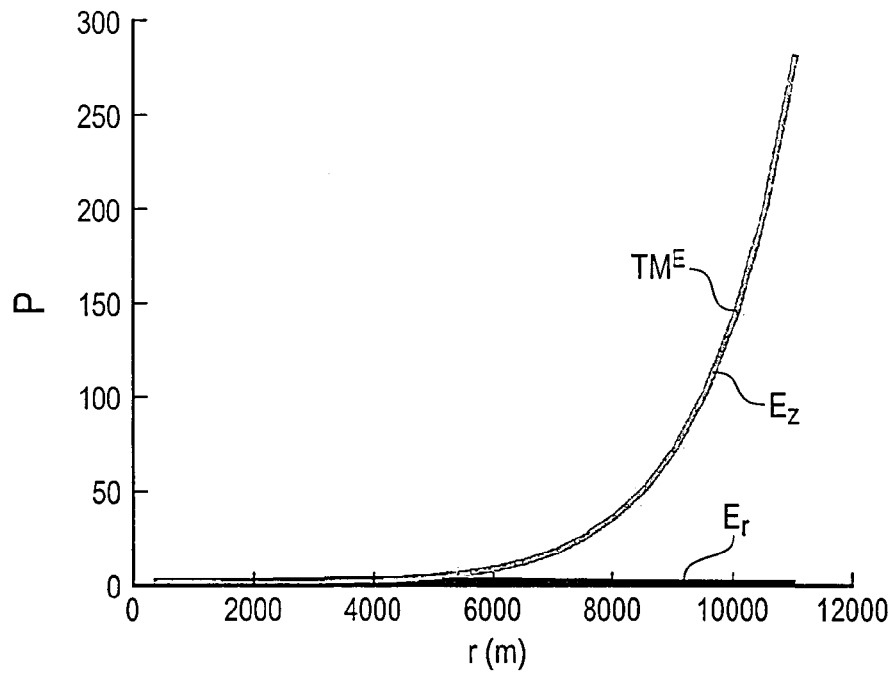
FIG. 10A is a graph schematically showing the ratio of the curves plotted in FIGS. 9A (radial electric field component), 9C (vertical electric field component) and 9E (electric TM mode decomposition) for a hydrocarbon reservoir of resistivity $\rho=100$ $\Omega$m to the corresponding curves for which there is no detectable hydrocarbon reservoir.

FIG. 10A is a graph schematically showing the ratio P of the curves plotted in FIGS. 9A (radial electric field component), 9C (vertical electric field component) and 9E (electric TM mode decomposition) for a hydrocarbon reservoir of resistivity ρ=100 Ωm to the corresponding curves for which there is no detectable hydrocarbon reservoir (i.e. ρ=1 Ωm). The curves are marked Er, Ez and $TM^E$ for the radial electric field, vertical electric field and electric TM mode decomposition respectively. FIG. 10A demonstrates the sensitivity of the electric TM mode decompositions to the presence of the hydrocarbon reservoir as a function of separation r and its similarity to the vertical electric field data. This is apparent from the large diversions from unity for the curve. As noted above, at a separation of r=11000 m, the electric TM mode decomposition is around 300-times greater with a ρ=100 Ωm hydrocarbon reservoir than when there is no detectable hydrocarbon reservoir (i.e. ρ=1 Ωm). The insensitivity of the radial electric field component to the presence of the hydrocarbon reservoir (due to the airwave component dominating the signal) is also clear.

Figure 10B:
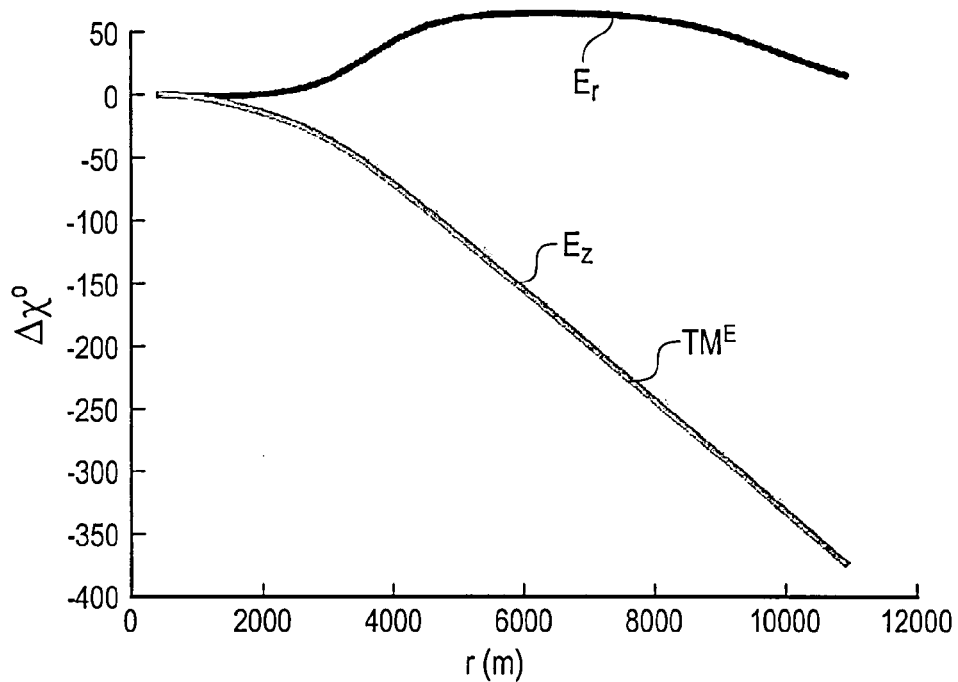
FIG. 10B is a graph schematically showing the difference in phase between the curves plotted in FIGS. 9B (radial electric field component), 9D (vertical electric field component) and 9F (electric TM mode decomposition) for a hydrocarbon reservoir of resistivity $\rho=100$ $\Omega$m and the respective corresponding curves for which there is no detectable hydrocarbon reservoir.

FIG. 10B is a graph schematically showing the difference in phase ∇χ between the curves plotted in FIGS. 9B (radial electric field component), 9D (vertical electric field component) and 9F (electric TM mode decomposition) for a hydrocarbon reservoir of resistivity ρ=100 Ωm and the respectively corresponding curves for which there is no detectable hydrocarbon reservoir (i.e. ρ=1 Ωm). The curves are marked Er, Ez and $TM^E$ respectively. FIG. 10B again demonstrates the sensitivity of the TM mode decomposition to the presence of the hydrocarbon reservoir as a function of separation r. This is apparent from the progressive increase in the absolute value of $\nabla\chi$. The relative insensitivity of the radial electric field component to the presence of the hydrocarbon reservoir is again seen.

Curves of the kind shown in FIGS. 9 and 10 which are derived from an actual CSEM survey of the kind shown in FIG. 6 data can be further analyzed using standard techniques, for example, geophysical inversion, to produce subterranean resistivity maps of the area being surveyed. These analysis techniques can be broadly similar to techniques previously used in deep water surveys for radial electric field data of the kind shown in FIG. 9A for conventional CSEM survey data analysis techniques for surveys, for example.

Because in practice, subterranean strata configurations are generally not as simple as those used in the model surveys described above, it can be difficult to identify directly from curves of the type shown in FIGS. 9E and 9F obtained from real surveys whether the curves contain features indicative of a buried hydrocarbon reservoir or merely features relating to local larger scale background structures. In particular the kind of TM mode decomposition data seen with a thin resistive hydrocarbon reservoir embedded in a uniform resistivity background can be similar to that seen in a subterranean strata configuration comprising layers of increasing resistivity with depth. This kind of increasing-resistivity structure is a feature of some submarine sedimentary basins, for example, and can arise due to the progressive expulsion of conductive pore fluids with increasing depths by a rising overburden pressure. Accordingly, knowledge of the large scale background structure of the subterranean strata in the area from which survey data are being analyzed is often helpful in order to determine reliably whether features in TM mode decomposition data are caused by a buried hydrocarbon layer or whether they are caused by large scale background structures.

Figure 11A:
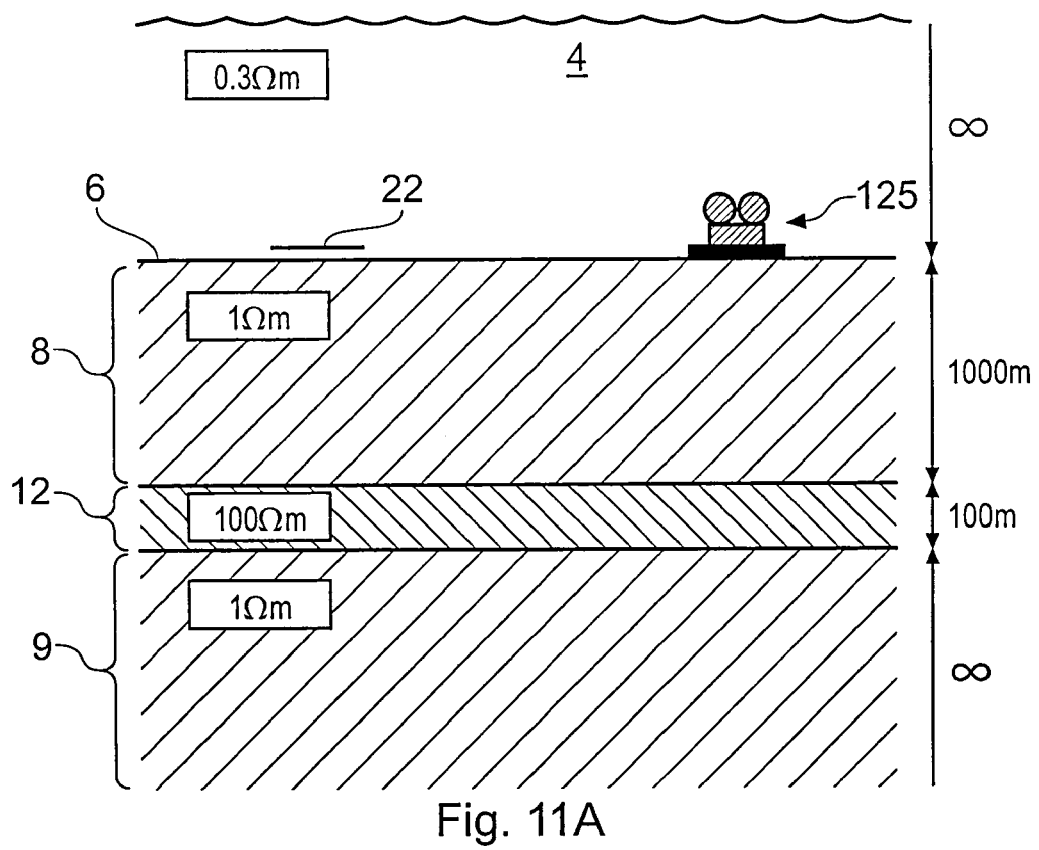
FIG. 11A shows in schematic vertical section a model hydrocarbon-reservoir bearing subterranean strata configuration.
Figure 11B:
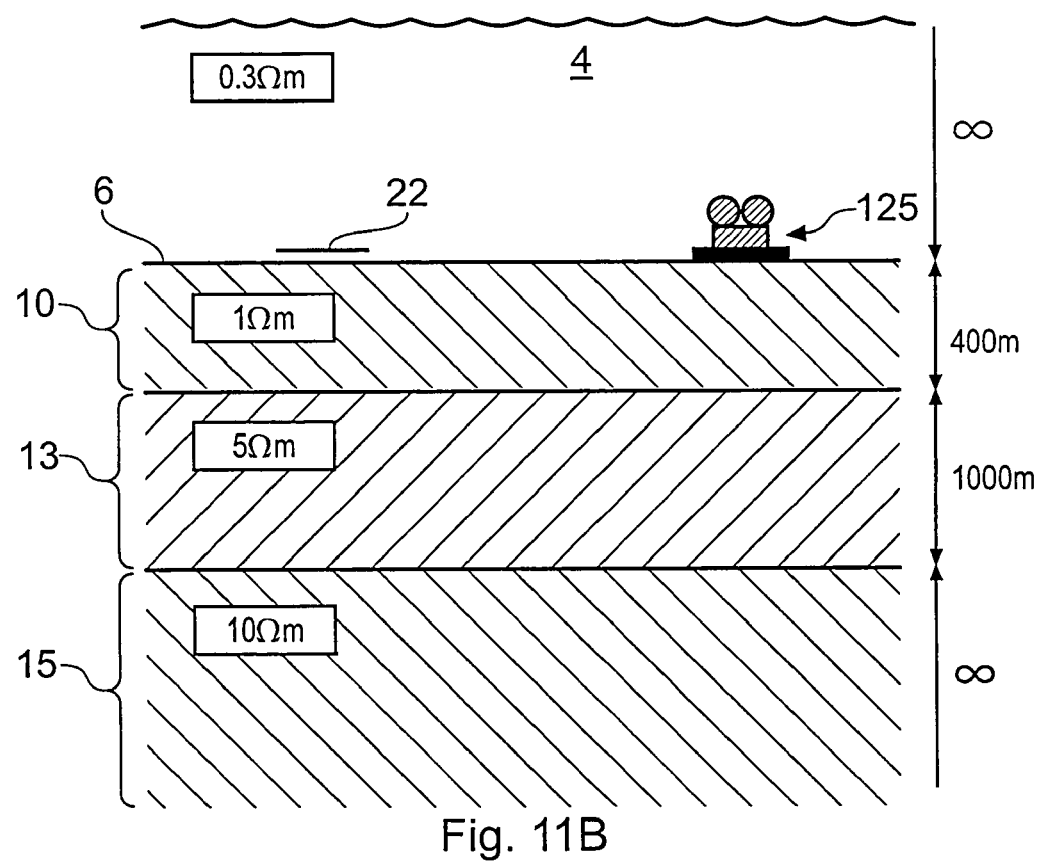
FIG. 11B shows in schematic vertical section a model increasing-resistivity subterranean strata configuration in which resistivity progressively increases with depth.

FIGS. 11A and 11B show two subterranean strata model configurations used to show the difficulty in distinguishing between a thin resistive hydrocarbon reservoir (FIG. 11A) and a steadily increasing resistivity with increasing depth (FIG. 11B). FIG. 11A shows a hydrocarbon-reservoir subterranean model configuration which is similar to that of FIG. 8 for the case where the hydrocarbon reservoir resistivity $\rho=100$ $\Omega$m. However, the model subterranean strata configuration of FIG. 11A includes an infinite depth of seawater, as opposed to the 100 m depth of seawater of FIG. 8. In the increasing-resistivity subterranean strata configuration model of FIG. 11B, a section of seafloor 6 lies beneath an infinite depth of seawater 4. The strata beneath the seafloor 6 comprise a series of sedimentary layers of increasing resistivity. A first layer 10 has a uniform resistivity of 1 $\Omega$m and a thickness of 400 m. A second layer 13 has a uniform resistivity of 5 $\Omega$m and a thickness of 1000 m. Beneath the second layer 13 is a third layer 15 which has a resistivity of 10 $\Omega$m and extends downwardly for an infinite extent. An HED transmitter 22 and a receiver 125 are also shown.

Figure 12A:
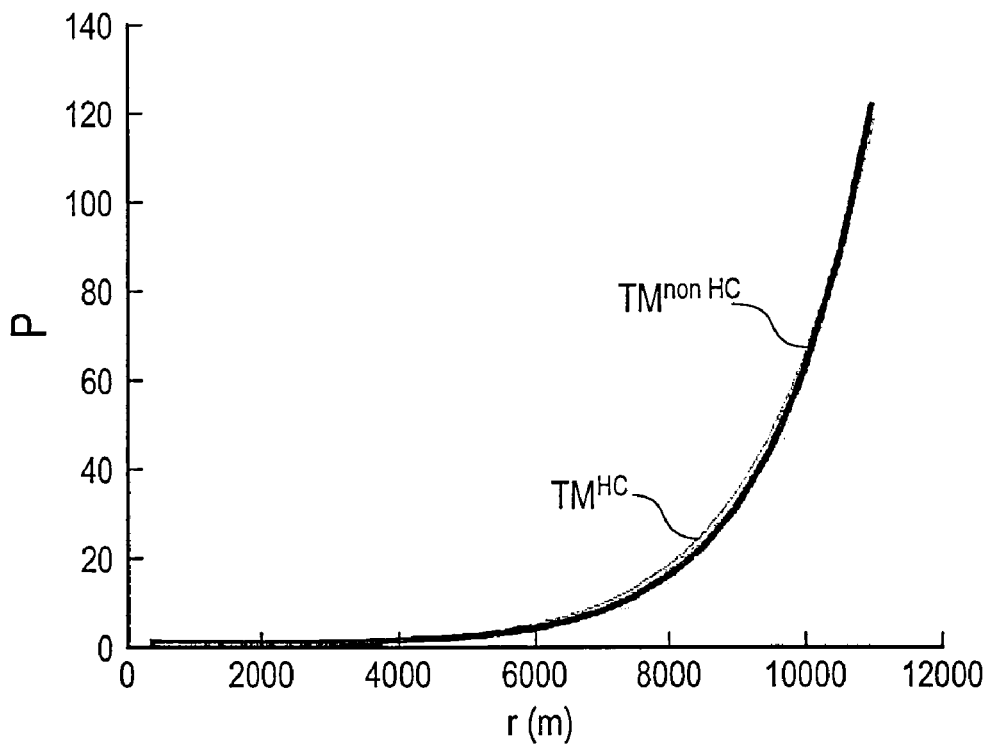
FIG. 12A is a graph schematically showing the ratios of electric TM mode decomposition data calculated for the model subterranean strata configurations shown in FIGS. 11A and 11B to those calculated for the background model subterranean strata configuration shown in FIG. 6 for infinite water depth.

FIG. 12A is a graph showing modeled curves for the electric TM mode decomposition data which are similar to and will be understood from the TM mode decomposition curves shown in FIG. 10A, but which are calculated for the hydrocarbon-reservoir subterranean strata configuration shown in FIG. 11A (marked $TM^{HC}$) and for the increasing-resistivity subterranean strata configuration shown in FIG. 11B (marked $TM^{non\ HC}$). It is clear that the TM mode decomposition data calculated for the hydrocarbon reservoir model are similar to the TM mode decomposition data calculated for the increasing resistivity model. This demonstrates the ambiguity that can arise with TM mode decomposition data when attempting to distinguish between a subterranean strata configuration having a hydrocarbon reservoir and some other large scale subterranean strata configurations.

Because of this possible ambiguity, analysis of survey data aimed at establishing whether a subterranean strata configuration contains a thin resistive hydrocarbon reservoir will normally involve generating TM mode decomposition data such as that defined by Equations 7 (electric) or 8 (magnetic). These response data are sensitive to the presence of subterranean hydrocarbon reservoirs, even in shallow water. However, in addition, to determine reliably whether features of the TM mode decomposition data are indicative of a hydrocarbon reservoir or of the local background structure, it is helpful to determine how the TM mode decomposition data for a given subterranean strata configuration would appear if there were no hydrocarbon reservoir.

This analysis step, generally referred to as normalization, is usually done with the aid of background data. Background data are specific to the area being surveyed and can be obtained in a variety of ways. One way is to model the EM survey performed to obtain the TM mode decomposition data with a model background subterranean strata configuration. The background model should be as close a match as possible to the actual background structure in the area being surveyed. A comparison of the TM mode decomposition data with the background data provides difference data sensitive to the likely presence, extent and location of a subterranean hydrocarbon reservoir embedded within the background subterranean strata configuration. For example, if the TM mode decomposition data closely match the background data, there is unlikely to be a buried hydrocarbon layer. If, on the other hand, there are differences, i.e. anomalies, in the TM mode decomposition data compared to the background data, for example, an increased receiver signal amplitude, this could be quantitatively assessed in terms of being indicative of a buried hydrocarbon reservoir. The variation in anomalies at different horizontal separations provides information on the depth and extent of a hydrocarbon reservoir. For example, if differences between the TM mode decomposition data and the background data are only apparent at large source-receiver horizontal separations, this is likely to indicate that the hydrocarbon reservoir is relatively deeply buried. Similarly, a discontinuity in TM mode decomposition data as a function of horizontal separation is likely to indicate a boundary or edge of a hydrocarbon reservoir at the location of the discontinuity.

Suitable background models to use in generating background data can be obtained in several ways.

One way of obtaining the information required to construct a suitable background model is with conventional MT electromagnetic surveying techniques. As noted above, these techniques are capable of providing information on large scale background resistivity structures, even though they are generally unable to detect hydrocarbon reservoirs directly.

Another way of obtaining the information required to construct a suitable background model is from CSEM survey data. As mentioned above, it is the TE mode component of a transmitted signal which can provide information on background structure is a CSEM survey. TE mode response data can be obtained from similar linear combinations of gradients in electric or magnetic field data to those give for the TM mode in Equations 7 and 8.

Equation 9, shown in FIG. 13A, defines a linear combination of a gradient in electric field data along measured along y with respect to x (i.e. $\partial E_y/\partial x$) and a gradient in electric field data measured along x with respect to y (i.e. $\partial E_x/\partial y$). Equation 9 defines combined response data which include only a TE mode dependence and no TM mode dependence.

Equation 10, shown in FIG. 13B, defines a linear combination of a gradient in magnetic field data along measured along x with respect to y (i.e. $\partial B_x/\partial y$) and a gradient in magnetic field data measured along y with respect to x (i.e. $\partial B_y/\partial x$). Equation 10 also defines combined response data which include only a TE mode dependence and no TM mode dependence.

The combined response data given by Equation 9 is referred to as electric TE mode decomposition data and the combined response data shown in Equation 10 is referred to as magnetic TE mode decomposition data.

Figure 12B:
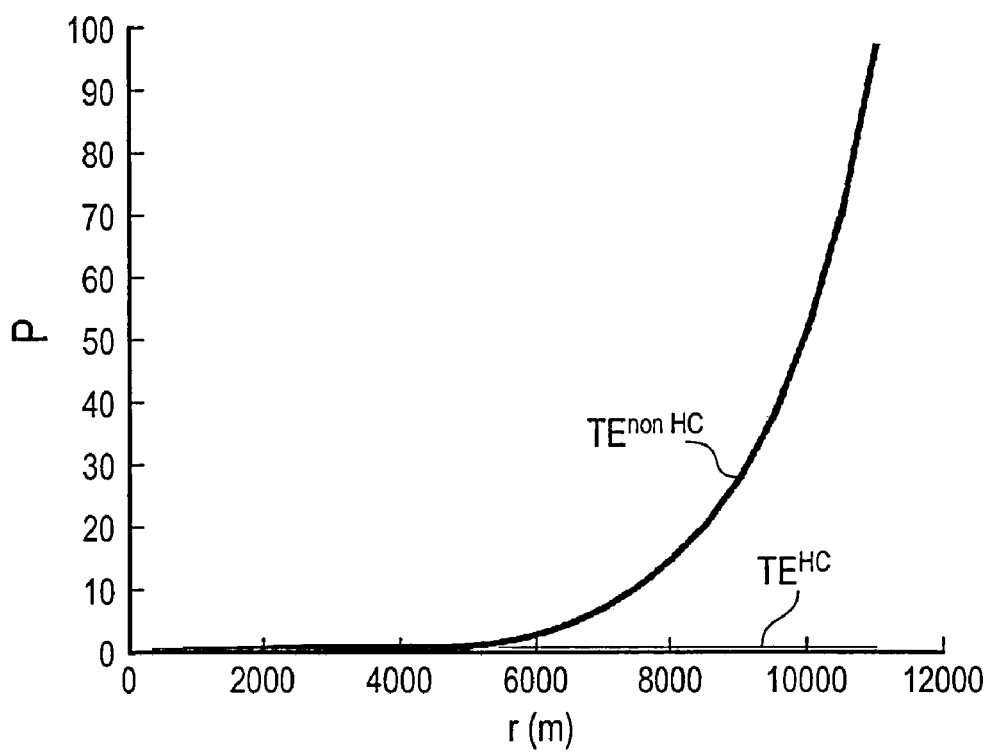
FIG. 12B is a graph schematically showing the ratios of electric TE mode decomposition data calculated for the model subterranean strata configurations shown in FIGS. 11A and 11B to those calculated for the background model subterranean strata configuration shown in FIG. 6 for infinite water depth.

FIG. 12B is a graph which is similar to and will be understood from FIG. 12A. However, whereas FIG. 12A plots data for the electric TM mode decompositions calculated for the model subterranean strata shown in FIGS. 11A and 11B, FIG. 12B plots data for the electric TE mode decompositions calculated for the same model subterranean strata configurations. The curve calculated for the hydrocarbon-reservoir subterranean strata configuration shown in FIG. 11A is marked $TE^{HC}$ and the curve for the increasing-resistivity subterranean strata configuration shown in FIG. 11B is marked $TE^{non\ HC}$. It is clear that the TE mode decomposition data calculated for the hydrocarbon reservoir model is very different to the TE mode decomposition data calculated for the increasing resistivity model.

Thus obtaining TE mode decomposition data of the kind defined in Equations 9 and 10 can help distinguish between different subterranean strata configurations, such as those shown in FIGS. 11A and 11B, which provide similar responses for the TM mode decomposition. Where this is done, once the TM mode decomposition data (as defined by either Equation 7 or 8) and the TE mode decomposition data (as defined by either Equation 9 or 10) are provided, they may be analyzed in an analogous manner to the analysis techniques applied to conventional inline (TM response dominated) and broadside (TE response dominated) CSEM data.

However, it is noted that in shallow water, the use of TE mode decompositions to assist in distinguishing different large scale background structures is prone to the same difficulties associated with the airwave component as described above. The impact of the airwave component can be reduced to some extent by employing relatively low frequency EM signals. Low frequency signals suffer less attenuation as they pass through the subterranean strata and so the airwave component is not so dominant in the EM fields induced at a receiver by an HED transmitter driven by a low frequency AC current. Because of this, low frequency signals are capable of providing information on large scale background resistivity structures needed to generate a background model. (Low frequency signals are not so helpful in identifying thin resistive layers directly due to the reduced spatial resolution associated with their long wavelengths.)

In other cases, an area to be surveyed will already be very well characterized by previous surveying. For example, in a producing oilfield or oil province there is likely to be a wealth of existing seismic and well-log data. In these cases, background models can be calculated from a rock formation model. The rock formation model can be created from the seismic data and then resistivities assigned to the various components in the rock structure using the resistivities obtained from well-log data. (If directly applicable well-log data are not available, it may be possible to estimate resistivity values by comparison with resistivity data from nearby wells in similar geological structures.) This technique for obtaining the information required to construct a suitable background model will be especially suited to applications in existing oilfields, such as monitoring long term depletion of reserves.

When monitoring depletion, it may be sufficient to directly compare TM mode decomposition data taken at different times, e.g. several weeks or months apart, without use of a rock formation model. In other words, the background data used is data from a previous similar survey. Differences in TM mode decomposition data taken at different times are indicative of changes in the hydrocarbon reservoir which have occurred between the times at which the data were taken. Because of this, this kind of comparison provides a useful monitoring tool. The TM mode decomposition data taken at the earlier time thus effectively acts as background data for comparing with the TM mode decomposition data taken at the later time.

Figure 14A:
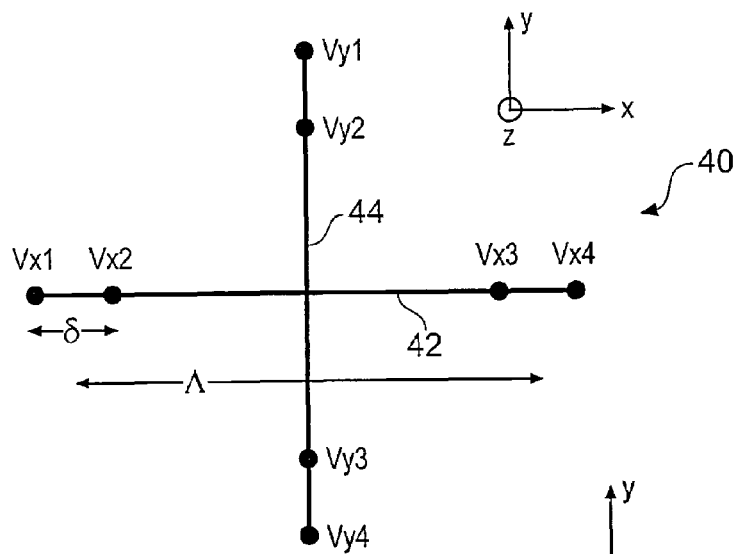
FIGS. 14A-14C show example detector configurations which may be used to obtain TM mode decomposition data.

FIG. 14A schematically shows in plan view an example detector 40 which may be used in a receiver 125 during a CSEM survey of the kind shown in FIG. 6. The detector 40 allows electric TM mode decomposition data to be obtained. The detector 40 comprises two orthogonal arms. An x-arm 42 defines the x direction while a y-arm 44 defines the y direction. The x-arm 42 supports four electrodes labeled Vx1, Vx2, Vx3 and Vx4. The y-arm 44 supports a further four electrodes labeled Vy1, Vy2, Vy3 and Vy4. The electrodes are connected to conventional circuitry (not shown) for measuring and recording the electrical potential of each electrode. The electrodes form respective pairs, Vx1 and Vx2 form a first pair, Vx3 and Vx4 form a second pair, Vy1 and Vy2 a third, and Vy3 and Vy4 a fourth. Each pair is separated by the same distance $\delta$ and the mid-points of pairs on the same support arm are separated by a distance $\Lambda$.

Electrical potential measurements Vx1 and Vx2 (corresponding to the electric potentials measured at the correspondingly labeled electrodes in FIG. 14A) allow the x component of electric field strength to be measured at the midpoint between Vx1 and Vx2, $$\left(\text{i.e. } Ex1 = \frac{Vx1 - Vx2}{\delta}\right).$$

A similar measurement of the x component of electric field can be made between electrodes Vx3 and Vx4, $$\left(\text{i.e. } Ex2 = \frac{Vx3 - Vx4}{\delta}\right).$$

Thus the gradient $\partial E_x/\partial x$, given by $$\frac{Ex1 - Ex2}{\Lambda},$$

can be determined. A similar calculation may be made for electrodes on the y-arm to give a measurement of the electric TM mode decomposition defined by Equation 7 as follows:

$$\frac{\partial E_x}{\partial x} + \frac{\partial E_y}{\partial y} \approx \left(\frac{Vx1 - Vx2 - Vx3 + Vx4}{\delta\Lambda}\right) + \left(\frac{Vy1 - Vy2 - Vy3 + Vy4}{\delta\Lambda}\right).$$

This is shown only as an approximate identity since it assumes gradients to be linear. In the case that the gradients are not linear over the length scale of the detector there will be a slight inaccuracy due to the gradients in the potentials and the gradients in the electric fields not being sampled at the same location (i.e. at the mid points of the respective pairs of electrodes and the mid-point of the detector respectively).

Figure 14B:
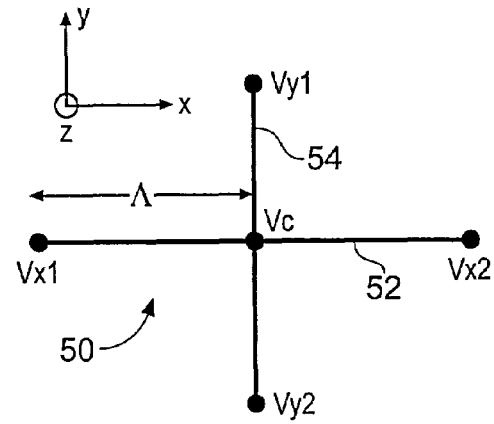

FIG. 14B schematically shows in plan view another example detector 50 which allows electric TM mode decomposition data to be obtained. The detector 50 again comprises an x-arm 52 and an orthogonal y-arm 54. The x-arm 52 supports two electrodes labeled Vx1 and Vx2. The y-arm 54 supports a further two electrodes labeled Vy1 and Vy2. A central electrode (i.e. common to both arms), labeled Vc, is located at the center of the detector. Each of the electrodes Vx1, Vx2, Vy1 and Vy2 are separated from the central electrode Vc by the same distance $\Lambda$. The detector shown in FIG. 14B can be considered to be a modification of the detector shown in FIG. 14A in which the electrodes Vx2, Vx3, Vy2 and Vy3 of the detector 40 shown in FIG. 14A are coincident (i.e. $\delta=\Lambda$) and so provide the same electrical potential measurement Vc. Thus, using the detector 50 shown in FIG. 14B, the electric TM mode decomposition defined by Equation 7 may be calculated as follows:

$$\frac{\partial E_x}{\partial x} + \frac{\partial E_y}{\partial y} \approx \left(\frac{Vx1 - 2Vc + Vx2}{\Lambda^2}\right) + \left(\frac{Vy1 - 2Vc + Vy2}{\Lambda^2}\right).$$

Figure 14C:
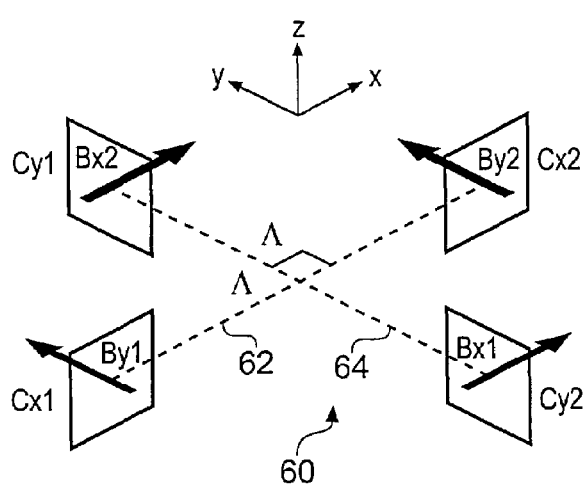

FIG. 14C schematically shows in perspective view an example detector 60 which may be used in a receiver 125 during a CSEM survey of the kind shown in FIG. 6. The detector 60 allows magnetic TM mode decomposition data to be obtained. The detector 60 comprises two orthogonal arms. An x-arm 62 defines the x direction while a y-arm 64 defines the y direction. The x-arm 62 supports two conventional coils for obtaining magnetic field data, labeled Cx1 and Cx2. The coils are arranged in the xz-plane. The y-arm 64 supports a further two coils labeled Cy1 and Cy2 arranged in the yz-plane. The coils are connected to conventional circuitry (not shown) for measuring and recording the magnetic flux density through each coil. Thus Cx1 measures a first magnetic field By1 along the y-direction, Cx2 measures a second magnetic field By2 along the y-direction, Cy1 measures a first magnetic field Bx1 along the x-direction and Cy2 measures a second magnetic field Bx2 along the x-direction. The center of the coils on each arm are separated by the same distance $\Lambda$. Thus, using the detector 60 shown in FIG. 14C, the magnetic TM mode decomposition defined by Equation 8 may be calculated as follows:

$$\frac{\partial B_y}{\partial x} - \frac{\partial B_x}{\partial y} \approx \left(\frac{By2 - By1 - Bx2 + Bx1}{\Lambda}\right).$$

Figure 14D:
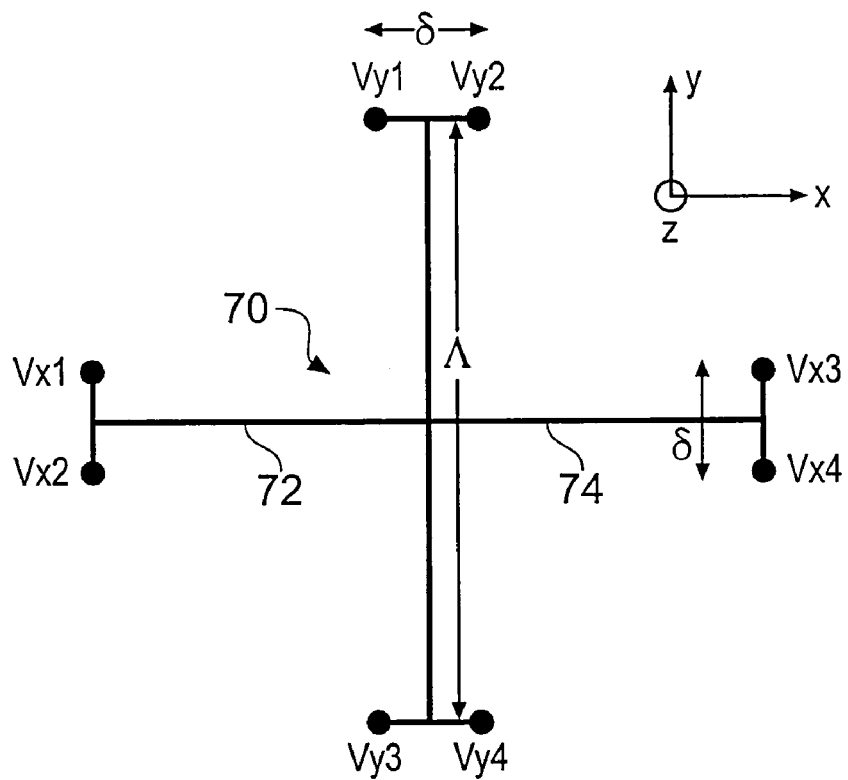
FIGS. 14D and 14E show example detector configurations which may be used to obtain TE mode decomposition data.

FIG. 14D schematically shows in plan view an example detector 70 which may be used to allow electric TE mode decomposition data to be obtained. The detector 70 comprises two orthogonal arms. An x-arm 72 defines the x direction while a y-arm 74 defines the y direction. The x-arm 72 supports four electrodes labeled Vx1, Vx2, Vx3 and Vx4. The y-arm 74 supports a further four electrodes labeled Vy1, Vy2, Vy3 and Vy4. As with the detector 40 shown in FIG. 14A, the electrodes are connected to conventional circuitry (not shown) for measuring and recording the electrical potential of each electrode. The electrodes are disposed in pairs positioned one to either side of each end of the arms. Each pair is separated by the same distance $\delta$ and the mid-point of pairs on the same support arm are separated by the same distance $\Lambda$. The detector 70 allows suitable gradients in electric field to be measured so that the electric TE mode decomposition defined by Equation 9 may be calculated as follows:

$$\frac{\partial E_y}{\partial x} - \frac{\partial E_x}{\partial y} \approx \left(\frac{Vx2 - Vx1 - Vx4 + Vx3}{\delta\Lambda}\right) - \left(\frac{Vy2 - Vy1 - Vy4 + Vy3}{\delta\Lambda}\right).$$

Figure 14E:
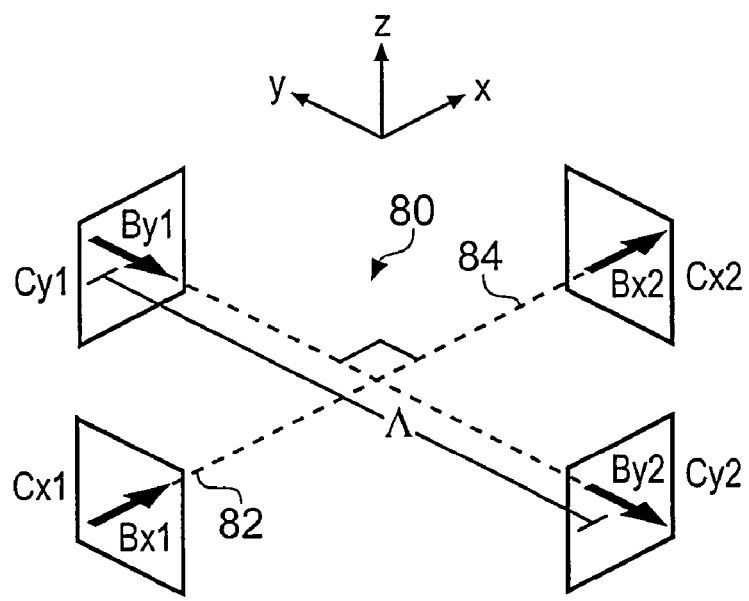

FIG. 14E schematically shows in perspective view an example detector 80 which allows magnetic TE mode decomposition data to be obtained. The detector 80 comprises orthogonal arms 62 and 64. Each arm supports two coils for obtaining magnetic field data, labeled Cx1, Cx2, Cy1 and Cy2. The detector 80 is similar to that shown in FIG. 14C, but with each coil being rotated 90 degrees about a vertical axis. Thus Cx1 measures a first magnetic field Bx1 along the x-direction, Cx2 measures a second magnetic field Bx2 along the x-direction, Cy1 measures a first magnetic field By1 along the y-direction and Cy2 measures a second magnetic field By2 along the y-direction. Again, the center of the coils on each arm are separated by the same distance $\Lambda$. Thus, using the detector 80, the magnetic TE mode decomposition defined by Equation 10 may be calculated as follows:

$$\frac{\partial B_x}{\partial x} + \frac{\partial B_y}{\partial y} \approx \left(\frac{Bx2 - Bx1 + By2 - By1}{\Lambda}\right).$$

It will be appreciated that many other arrangements of detectors will also allow appropriate horizontal gradients in electric and/or magnetic field data to be measured so that the electric and/or magnetic TM and/or TE mode decompositions described above can be obtained. It will also be appreciated that in some surveys receivers may include detectors suitable for measuring different combinations of combined response data. For example, a basic survey may use only a detector of the kind shown in FIG. 14A or 14B to measure only electric TM mode decomposition data for simplicity. Another survey might similarly use only a detector of the kind shown in FIG. 14C for obtaining magnetic TM mode decomposition data. However, to provide for improved sampling statistics, receivers employed in another survey might have detectors for obtaining both electric and magnetic TM mode decomposition data. Furthermore, in surveys where TE data are to be used to provide background structure data, a receiver having detectors for obtaining all four of the decompositions defined in Equations 7, 8, 9 and 10 might be used.

By way of example, an analysis of the behavior of a detector of the kind shown in FIG. 14A for obtaining electric TM mode decomposition data will now be considered.

FIG. 15A is a schematic gray scale representation of the magnitude of modeled electric TM mode decomposition data obtained per unit source dipole as a function of position in a 10-km square area of seafloor over the model subterranean strata configuration shown in FIG. 11A. The data are again scaled by the transmitter-receiver separation to provide an equivalent electric field. Data are modeled for an array of receivers arranged with a 200-m spacing on a regular Cartesian grid defined by A and B axes. The HED transmitter is a point dipole located at A=B=0 with its dipole axis parallel to the A-axis and is driven by an AC drive signal at a frequency of 0.25 Hz. The orientation of the detector of each receiver is assumed to be such that the x-direction is parallel to the A-axis for all receivers. The detector electrodes are arranged such that $\Lambda=1$ m (see FIG. 14A). In a practical survey, the value of $\delta$ will be chosen to be large enough that the measurement precision allows an expected magnitude of gradient to be measured between the electrode pairs. For the data shown in FIG. 15A, $\delta$ is taken to be vanishingly small.

FIG. 15B corresponds to FIG. 15A but shows the idealized theoretical modeled response using point detectors (i.e. $\Lambda=\delta=0$).

FIGS. 15C and 15D are similar to FIGS. 15A and 15B, but show the phase of the modeled electric TM mode decomposition data rather than magnitude.

It is clear from FIGS. 15A-D that the finite extent of the detectors does not significantly affect the modeled data compared to the data from idealized point detectors.

The curve marked $\Lambda=1$ m in FIG. 16A shows the percentage error $\delta$ in the modeled data shown in FIG. 15A compared to that in FIG. 15B as a function of range (i.e. source-receiver separation) for receivers inline with the dipole axis (i.e. as a function of A, for B=0). The curves marked $\Lambda=5$ m, $\Lambda=10$ m, $\Lambda=25$ m and $\Lambda=50$ m show similar curves for greater values of $\Lambda$ (as labeled). In each case, except for the discontinuity in the vicinity of the source, the percentage error is less that 1%. This is also the case for all azimuths except for near the extreme $\phi=90$ degrees, for which the electric TM mode decomposition for a one dimensional (1D) earth is of zero magnitude. FIG. 16B is similar to FIG. 16A, but shows phase data rather than magnitude data. Again, the percentage errors are substantially less than 1%. These figures demonstrate that the TM mode decomposition approach to CSEM surveying is feasible using realistic finite-sized detectors.

FIGS. 17A, 17B, 18A and 18B are similar to and will be understood from FIGS. 15A, 15B, 15C and 15D respectively. However, whereas FIGS. 15A-15D show the modeled TM mode decomposition for an array of receivers having $\Lambda=1$ m and each arranged with their x-axis parallel to the $\Lambda$ axis (i.e. also parallel to the dipole axis), in FIGS. 17 and 18, the modeled data are shown for $\Lambda=10$ m and with each receiver randomly oriented.

FIGS. 19A and 19B show the percentage errors $\epsilon$ in the modeled data shown in FIGS. 17A and 18A compared to those in FIGS. 17B and 18B respectively as a function of range for receivers inline with the dipole axis. Again excepting the discontinuity in the vicinity of the source, the percentage error is essentially 0% for all receivers. This is again also the case for all azimuths (except $\phi=90$ degrees). This demonstrates, that as noted above, the orientation of the x- and y-axis of each receiver relative to the receiver azimuth does not affect the TM mode decomposition calculations. This is a great benefit of the TM mode decomposition approach in that it is not necessary to record or take account of the orientation of a deployed detector.

Figure 20A:
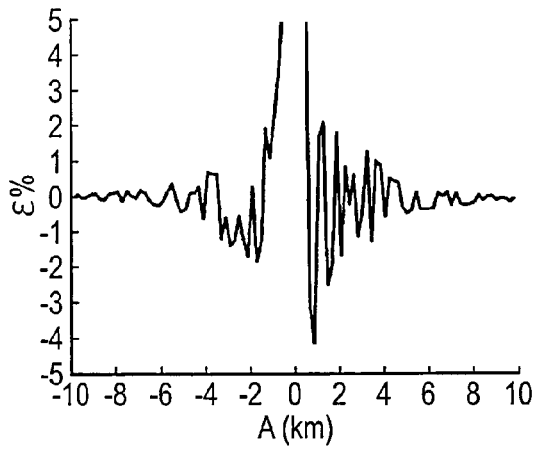
FIGS. 20A and 20B show percentage errors between TM mode decomposition data obtained at locations inline with a transmitter for a detector with translationally skewed arms relative to an idealized detector.
Figure 20B:
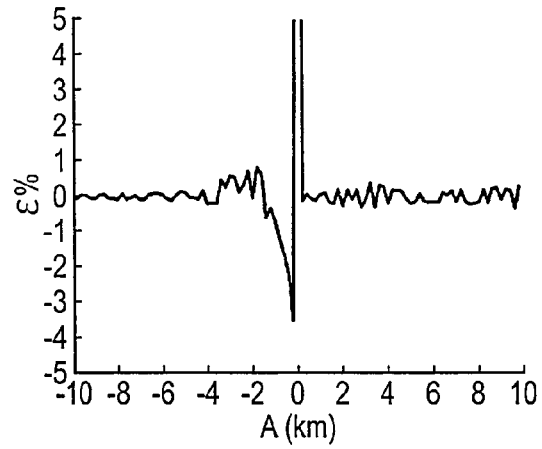

FIGS. 20A and 20B are similar to FIGS. 19A and 19B but show the percentage errors associated with detectors of the kind shown in FIG. 14A with $\Lambda=10$ m but with a 3 m translational skew in both x and y (i.e. such that the x- and y-arms do not cross at their center) compared to idealized response data. It is clear that while the percentage errors are relatively large for short ranges (i.e. where field gradients are steepest), beyond 1 km all errors are less than 5%. This shows the TM mode decomposition data are relatively robust to specific electrode positions within the detector.

Figure 21A:
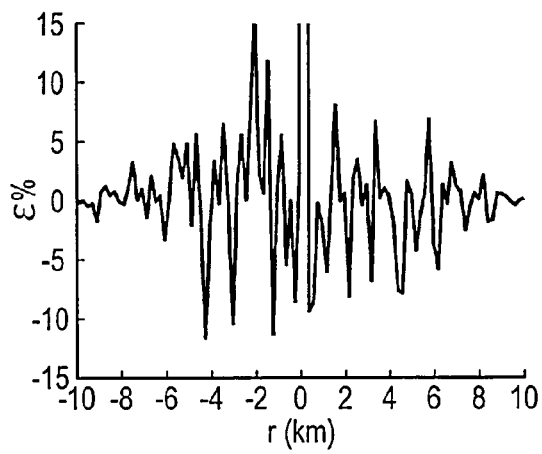
FIGS. 21A and 21B show percentage errors between TM mode decomposition data obtained at locations inline with a transmitter for a detector with a rotationally skewed arms relative to an idealized detector.
Figure 21B:
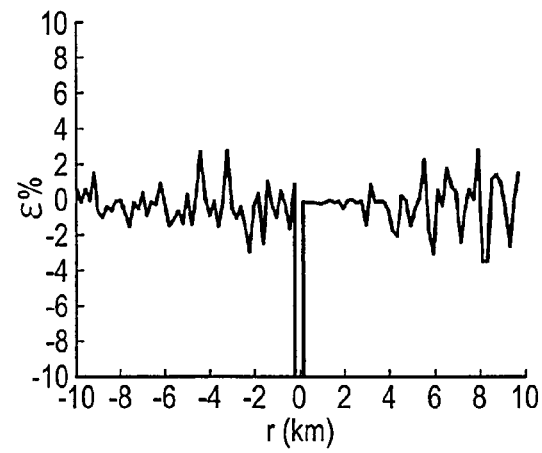

FIGS. 21A and 21B are similar to FIGS. 20A and 20B but show the percentage errors associated with detectors of the kind shown in FIG. 14A with $\Lambda=10$ m but with a random variation in the angle between x- and y-arms of each of the detectors (i.e. their arms not perfectly orthogonal) compared to idealized response data. Deviations from orthogonality for the detectors comprising the receiver array are normally distributed with a standard deviation of 1 degree. The errors are a little larger than seen with translationally skewed arms (shown in FIGS. 20A and 20B), but are generally less than 10%. This shows the TM mode decomposition is also relatively insensitive to effects arising from vibrations in the detector arms, for example.

The above analysis demonstrates the applicability of TM mode decompositions based on horizontal gradients in electromagnetic field to 1D earth structures, i.e. strata of infinite horizontal extent. In reality the earth is 3D and this can mean the TM and TE mode contributions to detected signals are mixed in a more complicated way that for a simple 1D earth. The 3D earth typically comprises subterranean strata that can be modeled as 3D structures embedded in a 1D background. If a 3D structure embedded in a 1D structure is relatively small, the TM mode decomposition will differ from that of the 1D structure alone at the position of the embedded structure. Thus an artifact which identifies the location of the 3D structure occurs in the data. If the 3D structure is larger, the TM mode decomposition will show an artifact at the embedded structure's boundary. This means the TM mode decomposition approach can be a powerful tool for detecting edges of hydrocarbon reservoirs.

FIG. 22A shows in schematic vertical section a 3D model subterranean strata configuration. An HED transmitter 22 and a receiver 125 are also shown. The 3D model subterranean strata configuration includes a section of seafloor 6 beneath a 120-meter depth of seawater 4 having resistivity 0.3 $\Omega$m. The strata beneath the seafloor 6 comprise a finite-extent hydrocarbon reservoir 90 within an otherwise uniform background structure 92 of infinite horizontal and semi-infinite vertical extent. The uniform background structure has a resistivity of 1 $\Omega$m. The finite-extent hydrocarbon reservoir has a vertical thickness of 50 m and a 6000 m×6000 m square extent in a horizontal plane, its upper face is 1575 m below the seafloor and the reservoir has a resistivity of 100 $\Omega$m.

FIG. 22B shows a schematic horizontal section through the center of the finite-extent hydrocarbon reservoir 90 within the 3D model subterranean strata configuration shown in FIG. 22A. The projected position of the transmitter 22 is marked by a cross 94.

FIG. 23A is a schematic gray scale representation of the magnitude of modeled electric TM mode decomposition data obtained per unit source dipole as a function of position in a 14-km square area of seafloor over the 3D model subterranean strata configuration shown in FIGS. 22A and 22B. The data are again scaled by the transmitter-receiver separation to provide an equivalent electric field. As with FIG. 15A, data are modeled for a regular square array of receivers arranged on a 200-m spacing on a Cartesian grid defined by A and B axes. The HED transmitter is a point dipole located at A=−5 km, B=0 km, with its dipole axis parallel to the A-axis. The transmitter is driven by an AC drive signal at a frequency of 0.25 Hz. The position of the buried finite-extent hydrocarbon reservoir is shown in outline by a white line. The square reservoir's edges are parallel to the A- and B-axis and are located at A=−6 km and 0 km and B=−3 km and 3 km. Thus the transmitter is 1 km inside of the left hand boundary of the reservoir as shown in FIG. 23A.

FIG. 23B is similar to FIG. 23A, but shows the phase of the modeled electric TM mode decomposition data rather than magnitude.

The curve marked $TM^{3D}$ in FIG. 24A plots the modeled data shown in FIG. 23A as a function of range (i.e. source-receiver separation) for receivers inline with the dipole axis (i.e. as a function of A, for B=0). The curve marked $TM^{1D}$ shows similar modeled data for a subterranean strata configuration which is similar to that shown in FIG. 22A, but for which the hydrocarbon reservoir is of infinite horizontal extent (i.e. a 1D model). FIG. 24B is similar to FIG. 24A, but plots the phase data rather than magnitude data. In both FIG. 24A and FIG. 24B, the locations of the reservoir boundaries at A=−6 km (left-hand boundary) and A=0 km (right-hand boundary) are indicated by dotted lines.

It can be seen that despite the 3D nature of the model subterranean strata, the TM mode decomposition still works and the combined response data are not significantly airwave contaminated. In addition, it can be seen from FIG. 24A that the reservoir edge at A=0 km generates an artifact in the data directly above it. When compared to the case with no edge (i.e. the 1D model), it can be seen that the effect of the edge is to locally increase the TM mode decomposition signal. Beyond the edge, the 1D TM mode decomposition signal is greater because of the continued effect of the buried resistive hydrocarbon reservoir. For the 3D case at ranges corresponding to receivers outside of the reservoir, the effect of the reservoir is reduced because of its limited horizontal extent between the transmitter and receiver and thus the signal enhancement is less. For smaller distances from the transmitter (i.e. either side of A=−5 km in FIG. 24A) the two curves are similar. This is because neither is sensitive to the buried reservoir (which is at a depth of 1575 m) for small offsets.

The artifact is less evident in the phase data shown in FIG. 24B. A slight deviation between the curves can be seen above the edge at A=0 km, and beyond this, as would be expected, the phase for the 1D model advance faster (i.e. shallower gradient). This is due to the resistive hydrocarbon reservoir spanning a greater extent between the transmitter and receivers in the 1D model compared to the 3D model for ranges outside of the reservoir.

Figures 25A, 25B:
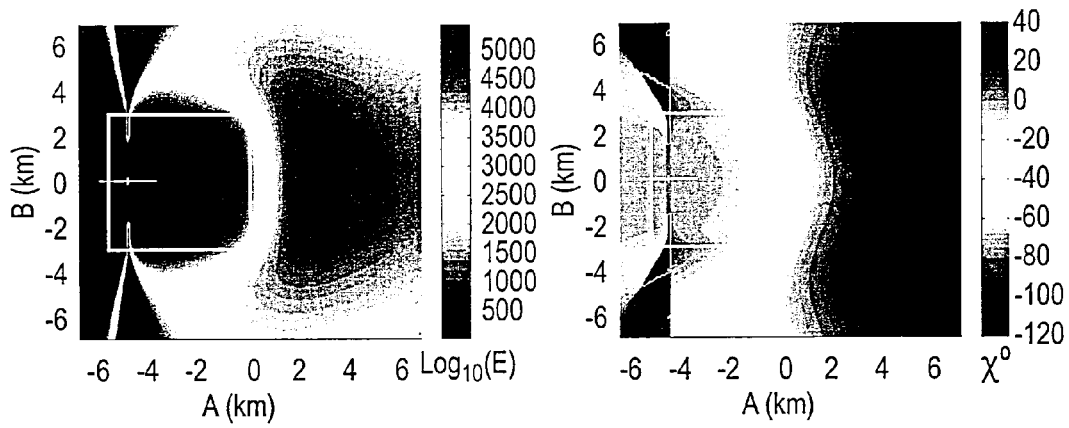
FIGS. 25A and 25B and FIGS. 26A and 26B are similar to FIGS. 23A and 23B and FIGS. 24A and 24B respectively, but show the data normalized to a uniform background subterranean strata configuration.

FIGS. 25A and 25B are similar to and will be understood from FIGS. 23A and 23B. However, whereas FIGS. 23A and 23B show the absolute magnitude and phase (relative to the transmitter signal) of the TM mode decomposition data, FIGS. 25A and 25B show the data normalized to a uniform background subterranean strata (i.e. as shown in FIG. 22A but without the hydrocarbon reservoir 90). This is done in a manner similar to that described above in relation to FIGS. 10A and 10B. That is to say, the ratio of the TM mode decomposition data shown in FIG. 23A relative to that of the corresponding background model is plotted in FIG. 25A and the corresponding differences in phase in FIG. 25B. The artifact at the edge of the reservoir is very clear in FIG. 25A as a bright region adjacent edges of the reservoir (again indicated by a white square).

Figures 26A, 26B:
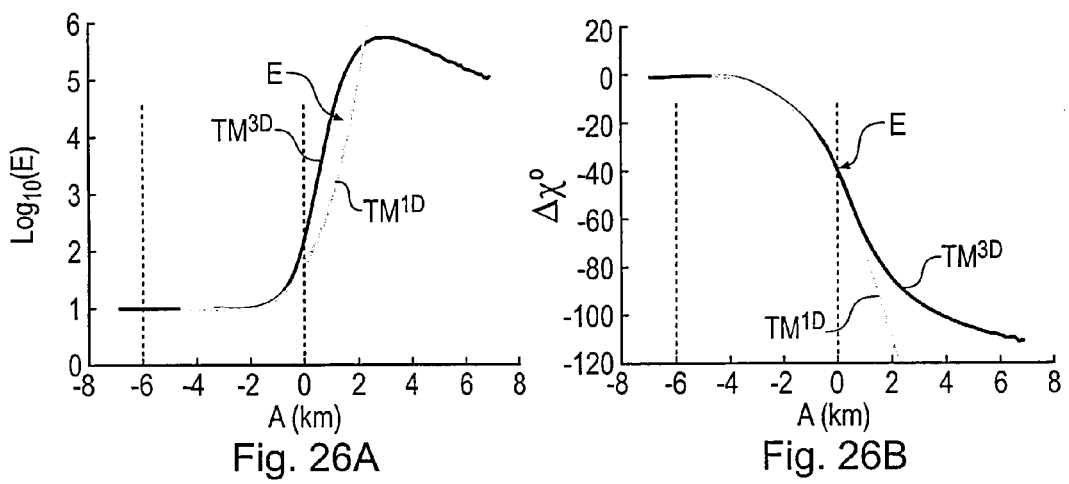

FIGS. 26A and 26B are similar to and will be understood from FIGS. 24A and 24B but plot normalized data corresponding to FIGS. 25A and 25B rather than the data shown in FIGS. 23A and 23B. The artifact associated with the edge of the reservoir in indicated by an arrow labeled E in both figures.

It can be seen from FIG. 26A that the TM mode decomposition signals for the model shown in FIG. 22A and the corresponding 1D model start to differ from that of a uniform background model (no reservoir) at an offset from the transmitter of around 3 km (i.e. A=−2 km). This is apparent from the departure from unity of both curves at this location. This is because at 3 km offset, the data are becoming sensitive to the hydrocarbon reservoir which is buried at a depth of around 1.5 km. Corresponding behavior is also seen for the phase plotted in FIG. 26B. Beyond this offset and in the vicinity of the edge, it can be seen that edge tends to increase the TM mode decomposition data and retard the phase when compared to the case for the 1D model subterranean strata configuration.

Figures 27A, 27B:
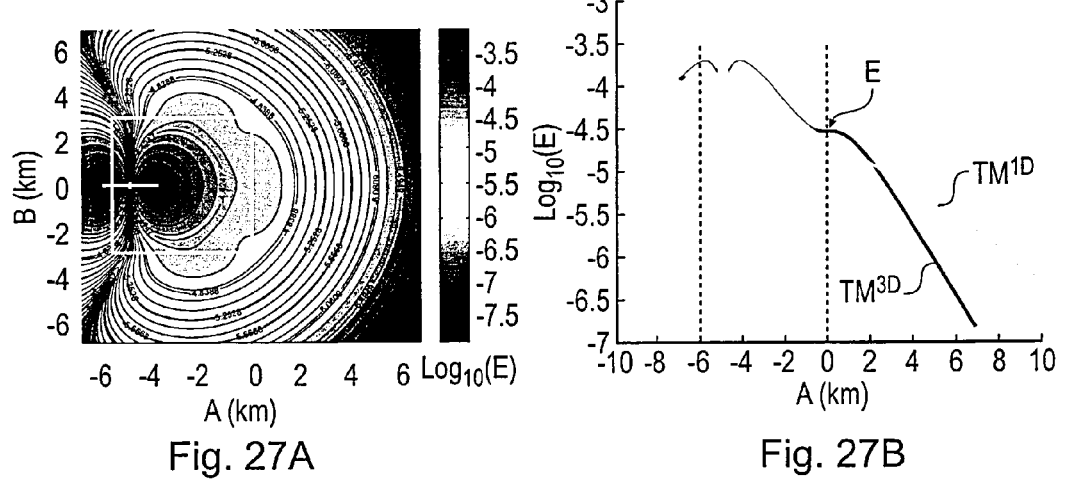
FIGS. 27A and 28A show schematic gray scale representations of the data shown in FIG. 23A, but scaled by an additional factor corresponding to the distance between the transmitter and receiver squared and cubed respectively.
FIGS. 27B and 28B schematically show the magnitude of the modeled TM mode decomposition data shown in FIG. 24A, but scaled by an additional factor corresponding to the distance between the transmitter and receiver squared and cubed respectively.

FIGS. 27A and 27B are similar to and will be understood from FIGS. 23A and 24A respectively. However, whereas in FIGS. 23A and 24A the TM mode decomposition data are scaled by range (i.e. multiplied by distance from transmitter to receiver) to provide an equivalent electric field, in FIGS. 27A and 27B the TM mode decomposition data are scaled by range-cubed. This compensates for energy spreading associated with spherical divergence. The artifact associated with the edge is even more apparent and effects at azimuths approaching 90 degrees are also more clear (FIG. 27A).

Figure 28A:
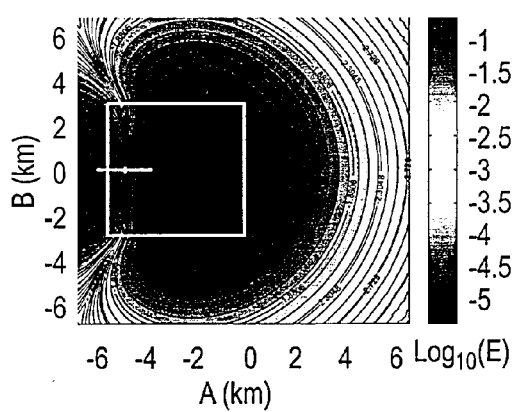
Figure 28B:
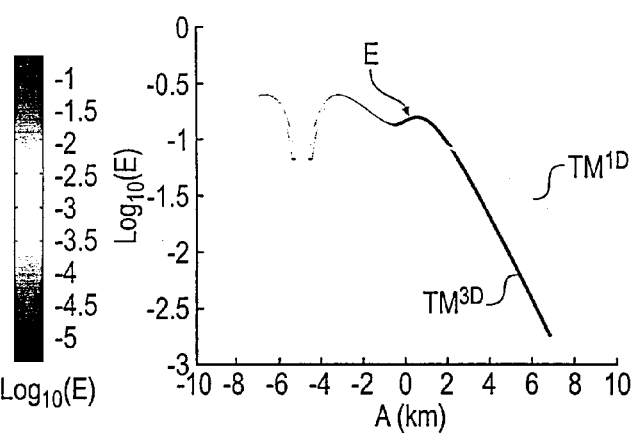

FIGS. 28A and 28B are similar to and will be understood from FIGS. 27A and 27A respectively but in which the TM mode decomposition data are scaled by range to the power four (i.e. equivalent electric field scaled by range-cubed). The edge artifact is more apparent still in these figures.

It is clear that not only can the TM mode decomposition approach identify the presence of a subterranean hydrocarbon reservoir, it is also able to identify edges of a buried reservoir having a finite extent.

It will be understood that although the above description has focussed more on electric TM mode decomposition data, magnetic TM mode decomposition data behave in a broadly similar fashion and could equally be employed in a practical CSEM survey.

Furthermore, it will also be appreciated although the above description is based on gradients in horizontal electric field seen at a receiver, because of the principle of reciprocity, schemes based on gradients arising from the source can equally be employed. This can be achieved using multiple horizontal electric dipole transmitters with an appropriate phase shift between them. These will be referred to as reciprocal arrangements (although it is of course arbitrary which arrangement is considered primary and which is considered reciprocal).

Figure 29A:
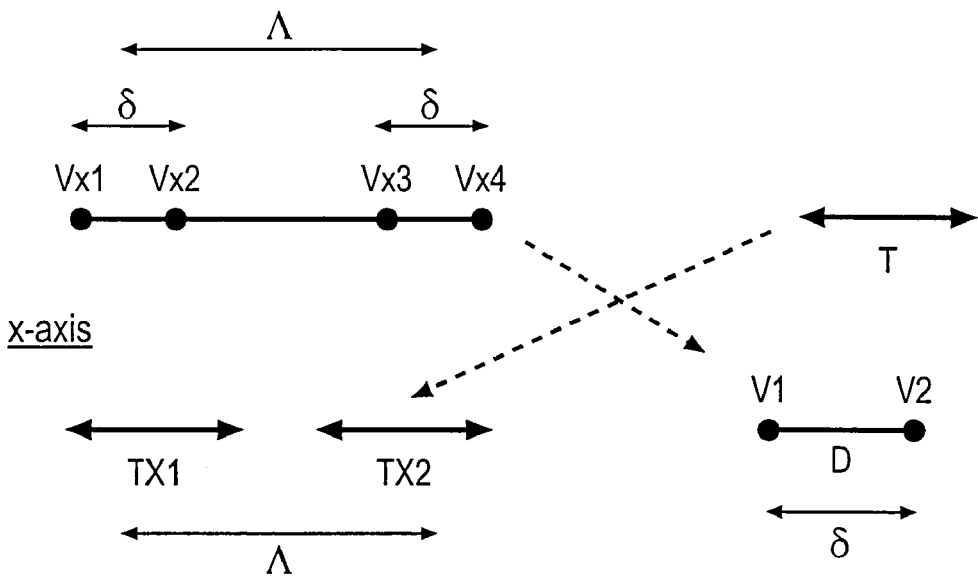
FIGS. 29A and 29B show an example source configuration which may be used to obtain TM mode decomposition data.
Figure 29B:
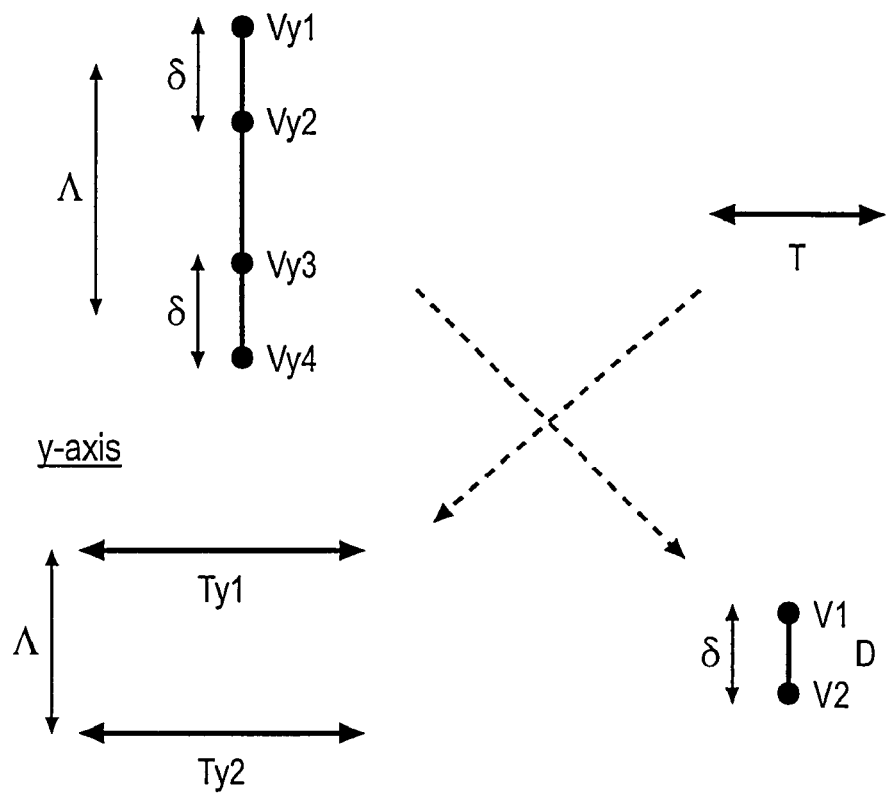

FIGS. 29A and 29B schematically show in plan view an example transmitter configuration which may be used as a source during a CSEM survey. For simplicity, transmitters associated with gradient measurements along the x- and y-axes are shown separately in FIGS. 29A and 29B respectively and will be referred to as first and second transmitter pairs respectively. For comparison, the corresponding configurations associated with the detector shown in FIG. 14A are shown in the upper half of each figure while the example transmitter configurations are shown in the bottom halves.

FIG. 29A shows first (Tx1) and second (Tx2) x-aligned horizontal electric dipole transmitters for broadcasting signals to be received by a horizontal electric dipole detector (D). This arrangement reciprocates the dipole detectors formed by pairs of electrodes Vx1 and Vx2, and Vx3 and Vx4 shown in the upper half of the figure (and FIG. 14A) and the single dipole transmitter T used with the detector arrangement shown in FIG. 14A. The centers of the transmitters Tx1 and Tx2 are separated by Λ and the electrodes V1 and V2 forming the detector D by δ. The transmitters Tx1 and Tx2 are shown spaced apart along the x-axis, however in other examples they may overlap to some extent.

FIG. 29B shows first (Ty1) and second (Ty2) y-aligned horizontal electric dipole transmitters for broadcasting signals to be received by the horizontal electric dipole detector (D). This arrangement reciprocates the dipole detectors formed by pairs of electrodes Vy1 and Vy2, and Vy3 and Vy4 shown in the upper half of the figure (and FIG. 14A). Again, the centers of the transmitters Ty1 and Ty2 are separated by Λ.

A calculation of the horizontal gradient along x of the x-component of electric field can made by driving Tx1 and Tx2 to simultaneously broadcast signals which are π out of phase. The gradient measurement is the signal measured by the detector D divided by the separation between the transmitters Λ. The π phase difference between the transmitter signals automatically provides a measurement representing the difference of the transmitter responses. As an alternative, the transmitters Tx1 and Tx2 could be driven at two different times (or simultaneously at different frequencies if the response is not strongly frequency dependent) so that the response to each transmitter can be separated and the difference between them formed. A calculation of the horizontal gradient along y of the y-component of electric field is similarly made by driving Ty1 and Ty2 to simultaneously broadcast signals which are π out of phase and dividing the measured signal by Λ.

Because of the principle of reciprocity, these gradient measurements correspond to those described above in connection with Equation 7, and a similar analysis can be applied to the data with similar results found.

One issue with this reciprocal arrangement is that the first and second transmitter pairs cannot be driven at the same frequency and at the same time. This is because each gradient calculation would then be contaminated by the other. As a consequence, data must either be collected in two phases at different times or simultaneously at different frequencies. This is so that the signals associated with the respective pairs of transmitters can be separated in the detector. If the variation in coupling between the transmitters and detectors is a strong function of frequency, it will be preferable to collect data from the first and second transmitter pairs at different times. This could be done by first collecting electromagnetic data using the first transmitter pair and then using the second transmitter pair, for example, or by time domain multiplexing. By analogy with the above discussion of distorted receiver geometries, it is not critical to have the centers of the first and second transmitter pairs at exactly the same location (or following the same trajectory during a tow). The centers can be offset without significantly impacting the TM decomposition. It is more important that the transmitters comprising the first and second transmitter pairs are close to parallel.

A second issue arises if the detector orientation is not aligned with respect to the transmitter dipoles of the source array. To provide optimum results in this case, the relative positions of each transmitter should be adapted such that a line connecting between the centers of the transmitters of the first transmitter pair is parallel to the detector dipole. The positions of the transmitters forming the second transmitter pair should be similarly adapted. Accordingly, if the orientation of the detector is not controllable, the relative positions of the transmitters should be in order to provide the best results.

Figure 30:
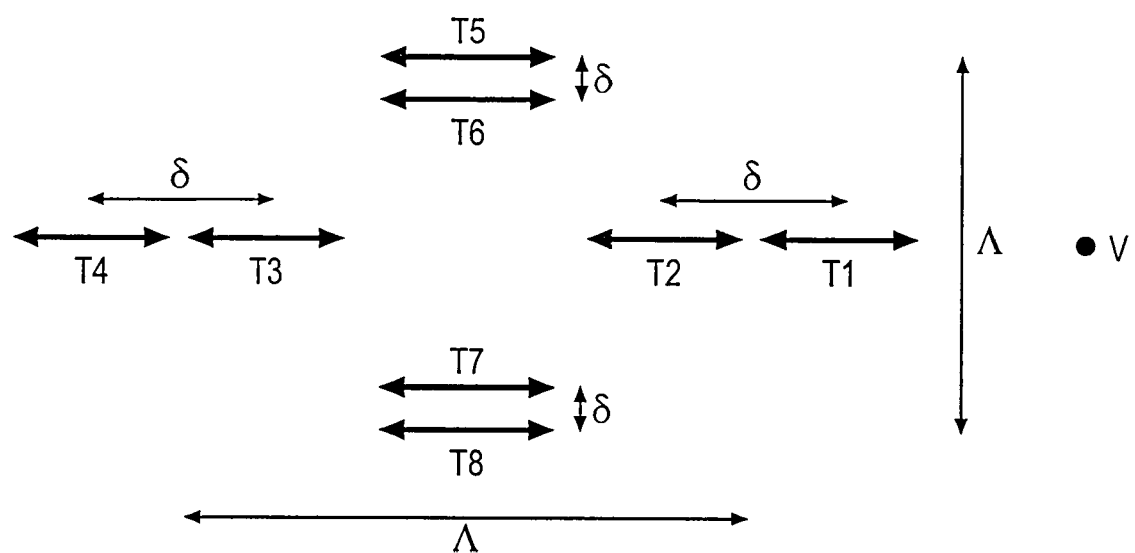
FIG. 30 shows another example source configuration which may be used to obtain TM mode decomposition data.

FIG. 30 shows another reciprocal transmitter configuration which addresses the issues arising the reciprocal arrangement shown in FIGS. 29A and 29B. The configuration comprises a source formed from eight dipole transmitters (T1-T8) and a receiver comprising a single monopole electrode detector V (i.e. a potential sensor). In this arrangement, all transmitters are driven simultaneously. Transmitters T1, T4, T5 and T8 are driven in phase with one another. Transmitters T2, T3, T6 and T7 are driven π out of phase from transmitters T1, T4, T5 and T8. The TM mode decomposition is given by $$TM decomposition = \frac{V}{\Lambda * \delta},$$

where V is the signal measured at the potential detector and Λ and δ relate to the transmitter separations as shown in the figure. In this example, the transmitter has a high degree of symmetry, although in practice it would not be necessary for all separations for all pairs of transmitters to be identical.

Because the TM mode decomposition can be made with all transmitters broadcasting at the same time, there is no need for data to be collected at different times, or for different frequencies to be used. In addition, because the detector is a simple potential sensor there are no issues relating to the detectors orientation with respect to the transmitters. In addition, because there is only one detection channel needed on the receiver, there are fewer issues regarding calibration and so on to be addressed. In effect, the TM mode decomposition (i.e. the summing of the two horizontal gradients shown in Equation 7) are measured and added physically by virtue of the transmitter-detector configuration, as opposed to being made mathematically.

An array of transmitters in a reciprocal configuration of the kind discussed above could be implemented in a practical CSEM survey by providing three streamers towed behind a boat or submarine in manner similar to that shown in FIG. 6, for example. This can be done with conventional streamer equipment guided by "paravanes", for example, such as is done for seismic surveys. Alternatively each of the transmitters could be towed one after another one.

It will be appreciated that while the above has described a reciprocal configuration for the electric TM mode decomposition (see Equation 7), similar reciprocal configurations can equally be made for the magnetic TM decomposition (Equation 8) and the TE mode decompositions (Equations 9 and 10) using appropriate magnetic/electric dipoles.

For conventional CSEM surveying based on geometric splitting of TE and TM mode responses, the most reliable data are collected with receivers positioned over relatively narrow ranges of azimuth—e.g. within +/−15 degrees of inline for the TM mode and within +/−15 degrees of broadside for the TE mode. This is because at intermediate azimuths, e.g. 45 degrees, the TM and TE modes both contribute significantly to the detected signal and so only the mixed response can be measured. Because the best data are only obtained for azimuths for which one mode dominates the other, surveys can be relatively inefficient in their data collection. However, the TM mode decomposition data described above can provide reliable data over much wider ranges of azimuth. This is because although the strength of the TM mode decomposition signal decreases with increasing azimuth (due to its cos($\phi$) dependence), there is still no TE mode contribution. Accordingly, at 45 degrees azimuth, for example, although the magnitude of the TM mode decomposition signal will be lower by a factor of $\sqrt{2}$ compared to that seen for inline orientations, so long as the signal is strong enough to be measured, it can still provide an indication of the subterranean strata response to the TM mode which is uncontaminated by the TE mode. This allows useable data to be collected over a wider range of azimuths than is possible with conventional surveying and so provides for more efficient surveys. So long as the transmitter provides a sufficiently strong signal that the magnitude of the TM mode decomposition data are sufficiently large compared to any noise, useable data can be obtained for any azimuth.

It will be understood that whilst the above description describes a towed HED transmitter, the method would also be applicable in a fixed installation. For example, the method could be used to monitor changes to a hydrocarbon reservoir from which hydrocarbon is being drawn. In such cases it will be appropriate to employ one (or more) HED transmitter(s) in fixed positions relative to a receiver array rather than undertake frequent towed surveys. The HED transmitter(s) could be anchored to the seafloor or suspended from an oil-rig platform, for example. In other examples, the HED transmitter(s) could be placed in a horizontal well or borehole, e.g. a geotechnical borehole. In the case of a producing oil field, the subterranean structures are likely to be well known already from prior geophysical surveys and drilling results. Indeed, prior geophysical and geological information from the oil field can be used to construct a background model as described above.

Although the above description has concentrated on the application of embodiments of the invention to hydrocarbon reservoirs, it will be appreciated that the above described techniques may also be used for other CSEM surveys. This is because CSEM surveying is sensitive to the geoelectric properties of the earth (e.g. electrical resistivity of sub-surface strata), and not to hydrocarbon reservoirs in particular. As a consequence, embodiments of the invention are equally applicable to surveying for other resistive or conductive bodies (i.e. having a resistivity different to that of the background surrounding strata) and not just for direct hydrocarbon detection.

Embodiments of the invention may be applied to structural mapping of salt or basalt bodies for example and also where more conductive strata are present in the earth, such as siliceous sediments. In these cases, the technique and mathematics (including the decompositions to overcome the shallow water problem) are in essence the same.

In addition to surveying for oil and gas, examples of particular exploration environments in which CSEM surveying techniques of the kind described above can be useful include the following:

Marine gas hydrates. There is interest in studying gas hydrate deposits for a number of reasons. Firstly, they are considered to be a hazard to be avoided while drilling the sea floor. This is because they can cause the subterranean strata to be unstable and lead to seafloor collapse, and because their release into the atmosphere can be environmentally damaging as they are a source of powerful greenhouse gases. Secondly, such hydrates are a potential source of energy. Marine gas hydrates typically occur in the upper few hundred meters of the seafloor. Their resistivities vary with hydrate content, but are typically on the order of 2-6 $\Omega$m. When applying the above described techniques to surveying for marine gas hydrates, higher frequencies and smaller offsets (which are more sensitive to shallow structure) might be preferred during acquisition of the CSEM data.

Salt bodies: In the oil exploration environment the mapping of salt bodies can be of interest. Such salt bodies usually have a large extent (several kilometers is not unusual), are highly resistive (few hundred $\Omega$m to a thousand $\Omega$m) and can be several hundred meters to more than a kilometer thick. It is quite common that hydrocarbon reservoirs are found close to or beneath them. However mapping salt bodies can be technically challenging using conventional seismic methods—although the top of the bodies can in general be constrained, the high degree of seismic scattering they cause can make the sides and bottom more elusive. This leads to ambiguities in interpretation. In such circumstances marine CSEM methods can provide valuable complementary information on the extent of the salt body.

For similar reasons, CSEM data can also be used to complement more conventional exploration techniques in areas where intrusive volcanic layers are present in the section.

Finally, it will be understood that the invention is equally applicable to surveying of freshwater, for example large lakes or estuaries, so that references to seafloor, seawater etc. should not be regarded as limiting and should be interpreted as covering lakebed, riverbed etc. Indeed the applicability of the invention to shallow water makes it ideal for surveying shallow lakes.

REFERENCES

[1] GB 2382875 A
[2] MacGregor, L. M. & Sinha, M. C. Use of marine controlled source electromagnetic sounding for sub-basalt exploration. Geophysical Prospecting, 48, 2000, 1091-1106.
[3] WO 02/14906 A1
[4] MacGregor, L. M., Constable, S. C. & Sinha, M. C. The RAMESSES experiment III: Controlled source electromagnetic sounding of the Reykjanes Ridge at 57° 45' N. Geophysical Journal International, 135, 1998, 773-789.
[5] Eidesmo, T., Ellingsrud, S., MacGregor, L. M., Constable, S., Sinha, M. C., Johansen, S., Kong, F-N & Westerdahl, H., Sea Bed Logging (SBL), a new method for remote and direct identification of hydrocarbon filled layers in deepwater areas. First Break, 20, 2002, 144-152.
[6] Ellingsrud, S., Eidesmo, T., Johansen, S., Sinha, M. C., MacGregor, L. M. & Constable, S. Remote sensing of hydrocarbon reservoirs by seabed logging (SBL): Results from a cruise offshore Angola. The Leading Edge, 21, 2002, 972-982.
[7] Chave, A. D. & Cox, C. S., Controlled electromagnetic sources for measuring electrical conductivity beneath the oceans, 1. Forward problem and model study. J. Geophys. Res., 87, 5327-5338, 1982.
[8] Constable, S. C., Orange, A., Hoversten, M., Morrison, H. F., Marine magnetotellurics for petroleum exploration Part 1: A seafloor equipment system, Geophysics, 63, 1998, 816-825.
[9] U.S. Pat. No. 5,770,945
[10] GB 2402745 A

What is claimed is:

1. A method of monitoring an area that contains a subterranean resistive or conductive body, comprising:
   providing at least one horizontal electric dipole transmitter and at least one receiver for obtaining electric or magnetic field data at different times;
   measuring horizontal gradients in a first component of the electric or magnetic field data along a first direction at the different times; and
   measuring horizontal gradients in a second component of the electric or magnetic field data along a second direction at the different times.

2. A method according to claim 1, further comprising comparing the measured horizontal gradients from the different times to identify changes in the subterranean resistive or conductive body.

3. A method according to claim 2, wherein the changes in the subterranean resistive or conductive body are changes in a boundary or edge of the subterranean resistive or conductive body.

4. A method according to claim 2, wherein comparing the measured horizontal gradients from the different times to identify changes in the subterranean resistive or conductive body comprises combining the horizontal gradients along the first and second directions to generate combined response data for a first time and combining the horizontal gradients along the first and second directions to generate combined response data for a second time, and comparing the combined response data for the first time with the combined response data for the second time.

5. A method according to claim 1, wherein the first component of the electric or magnetic field data is the electric field strength parallel to the first direction and the second component of the electric or magnetic field data is the electric field strength parallel to the second direction.

6. A method according to claim 1, wherein the first component of the electric or magnetic field data is the magnetic field strength perpendicular to the first direction and the second component of the electric or magnetic field data is the magnetic field strength perpendicular to the second direction.

7. A method according to claim 1, wherein the first and second directions are orthogonal to one another.

8. A method according to claim 1, wherein the at least one horizontal electric dipole transmitter and at least one receiver are provided in a fixed installation.

9. A method according to claim 8, wherein the fixed installation comprises one or more horizontal electric dipole transmitters in fixed positions relative to an array of receivers.

10. A method according to claim 1, wherein the at least one horizontal electric dipole transmitter is anchored to the seafloor or suspended from an oil-rig platform or placed in a horizontal well or placed in a borehole.

11. A method according to claim 1, wherein the at least one horizontal electric dipole transmitter is a towed horizontal electric dipole transmitter.

12. A method of monitoring according to claim 1, wherein the subterranean body is a hydrocarbon reservoir from which hydrocarbon is being drawn.

13. A method for obtaining hydrocarbon from an area that contains a subterranean hydrocarbon reservoir, comprising:
  penetrating the subterranean hydrocarbon reservoir with a hydrocarbon-producing well;
  extracting hydrocarbon from the subterranean hydrocarbon reservoir using the hydrocarbon-producing well;
  providing at least one horizontal electric dipole transmitter and at least one receiver for obtaining electric or magnetic field data at different times;
  measuring horizontal gradients in a first component of the electric or magnetic field data along a first direction at the different times; and
  measuring horizontal gradients in a second component of the electric or magnetic field data along a second direction at the different times; and
  continuing to extract hydrocarbon from the hydrocarbon-producing well as the measured gradients at different times are used to monitor depletion of the reservoir.

14. A volume of hydrocarbon obtained from an area that contains a subterranean hydrocarbon reservoir, the hydrocarbon obtained by:
  penetrating the subterranean hydrocarbon reservoir with a hydrocarbon-producing well;
  extracting hydrocarbon from the subterranean hydrocarbon reservoir using the hydrocarbon-producing well;
  providing at least one horizontal electric dipole transmitter and at least one receiver for obtaining electric or magnetic field data at different times;
  measuring horizontal gradients in a first component of the electric or magnetic field data along a first direction at the different times; and
  measuring horizontal gradients in a second component of the electric or magnetic field data along a second direction at the different times; and
  continuing to extract hydrocarbon from the hydrocarbon-producing well as the measured gradients at different times are used to monitor depletion of the reservoir.

* * * * *